(12) United States Patent
Takano et al.

(10) Patent No.: US 9,610,606 B2
(45) Date of Patent: Apr. 4, 2017

(54) METHOD FOR APPLYING SEALING MATERIAL PASTE TO PERIPHERAL SURFACE OF CERAMIC BLOCK

(71) Applicant: IBIDEN CO., LTD., Ogaki-shi (JP)

(72) Inventors: Tomohiro Takano, Ibi-gun (JP); Kazuya Bando, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 217 days.

(21) Appl. No.: 14/495,896

(22) Filed: Sep. 25, 2014

(65) Prior Publication Data

US 2015/0017330 A1 Jan. 15, 2015

Related U.S. Application Data

(63) Continuation of application No. PCT/JP2012/058392, filed on Mar. 29, 2012.

(51) Int. Cl.
*B05D 3/12* (2006.01)
*B05D 1/40* (2006.01)
(Continued)

(52) U.S. Cl.
CPC ............... *B05D 1/40* (2013.01); *B01J 32/00* (2013.01); *B01J 35/00* (2013.01); *B05C 9/12* (2013.01);
(Continued)

(58) Field of Classification Search
CPC .. B05D 1/40; B05D 2203/30; B05D 2254/00; C04B 41/00; C04B 41/45; C04B 41/4505; C04B 41/4535; C04B 41/4539; C04B 41/4572; C04B 41/46; C04B 41/50; C04B 41/52; C04B 41/522; C04B 41/524; C04B 41/526; B28B 19/0038;
(Continued)

(56) References Cited

U.S. PATENT DOCUMENTS 1,926,387 A * 9/1933 Jansen ................... B05C 9/027
118/208
2,884,654 A * 5/1959 Fall ........................... F16J 9/20
15/104.04
(Continued)

FOREIGN PATENT DOCUMENTS

EP 0 653 300 A1 * 5/1995
EP 1632657 3/2006
(Continued)

*Primary Examiner* — William Phillip Fletcher, III
(74) *Attorney, Agent, or Firm* — Mori & Ward, LLP

(57) ABSTRACT

A method of manufacturing a honeycomb structured body, includes providing an application jig. A sealing material paste is put on a peripheral surface of a pillar-shaped ceramic block. The application jig is set in such a manner that a first principal surface of the application jig faces upward and a second principal surface of the application jig faces downward. The ceramic block is placed inside a second opening section of the application jig. The ceramic block is passed through an opening section of the application jig so that a face defining the second opening section spreads an entire peripheral surface of the ceramic block with the sealing material paste to manufacture a honeycomb structured body with a peripheral sealing material layer formed on the peripheral surface of the ceramic block.

9 Claims, 14 Drawing Sheets

(51) Int. Cl.
| | |
|---|---|
| B05C 9/12 | (2006.01) |
| C04B 41/45 | (2006.01) |
| C04B 41/00 | (2006.01) |
| C04B 41/52 | (2006.01) |
| C04B 41/46 | (2006.01) |
| C04B 41/50 | (2006.01) |
| B01J 35/00 | (2006.01) |
| B01J 32/00 | (2006.01) |
| B28B 19/00 | (2006.01) |
| C04B 41/85 | (2006.01) |

(52) U.S. Cl.
CPC ............ *B05D 3/12* (2013.01); *B28B 19/0038* (2013.01); *C04B 41/00* (2013.01); *C04B 41/009* (2013.01); *C04B 41/45* (2013.01); *C04B 41/4505* (2013.01); *C04B 41/4535* (2013.01); *C04B 41/4539* (2013.01); *C04B 41/4572* (2013.01); *C04B 41/46* (2013.01); *C04B 41/50* (2013.01); *C04B 41/5089* (2013.01); *C04B 41/52* (2013.01); *C04B 41/522* (2013.01); *C04B 41/524* (2013.01); *C04B 41/526* (2013.01); *C04B 41/85* (2013.01); *B01D 2253/342* (2013.01); *B05D 2203/30* (2013.01); *B05D 2254/02* (2013.01); *Y10S 502/52719* (2013.01); *Y10S 502/52723* (2013.01)

(58) Field of Classification Search
CPC ........... Y10S 502/00; Y10S 502/52719; Y10S 502/52723; B01J 32/00; B01J 35/00; B01D 2253/342

USPC .......................... 427/230–239; 118/DIG. 11
See application file for complete search history.

(56) References Cited

U.S. PATENT DOCUMENTS

| | | | | |
|---|---|---|---|---|
| 4,018,953 | A | * | 4/1977 | Martellock .......... G03G 5/0525 118/404 |
| 4,426,954 | A | | 1/1984 | Keller |
| 5,147,762 | A | * | 9/1992 | Verheesen ................. G03F 7/12 101/128.4 |
| 5,257,432 | A | * | 11/1993 | Duke ................... F16J 15/3208 15/104.04 |
| 5,433,913 | A | | 7/1995 | Kawauchi et al. |
| 5,647,907 | A | * | 7/1997 | van der Meulen ....... B05C 3/18 101/120 |
| 2006/0225390 | A1 | * | 10/2006 | Yoshida ................ C04B 37/005 55/523 |
| 2007/0126160 | A1 | * | 6/2007 | Takahashi .......... B01D 39/2068 264/628 |
| 2010/0086696 | A1 | | 4/2010 | Tokumaru |

FOREIGN PATENT DOCUMENTS

| | | |
|---|---|---|
| JP | 61-18520 U | 2/1986 |
| JP | 2008-093627 | 4/2008 |
| JP | 2008-119604 | 5/2008 |
| JP | 2010-221165 | 10/2010 |
| JP | 2011-245854 | 12/2011 |
| JP | 2013-139025 A * | 7/2013 |
| WO | WO 2005/045210 | 5/2005 |
| WO | WO 2008/117729 | 10/2008 |

* cited by examiner

B-B line cross-sectional view

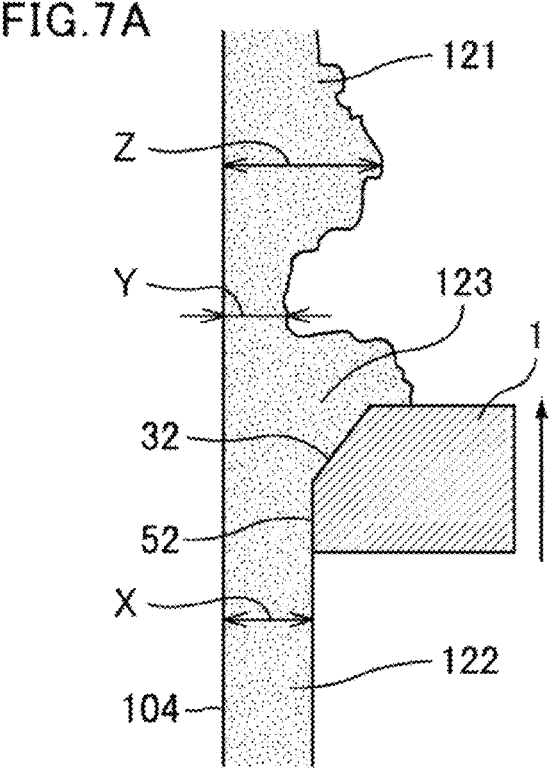
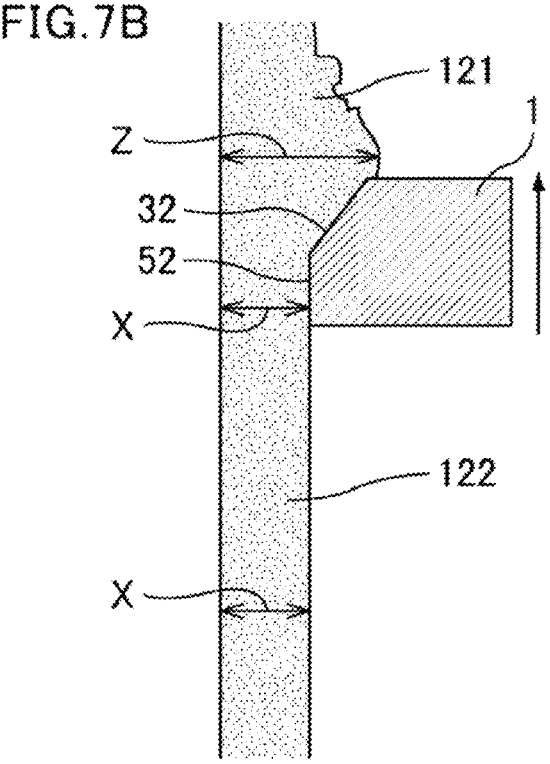

METHOD FOR APPLYING SEALING MATERIAL PASTE TO PERIPHERAL SURFACE OF CERAMIC BLOCK

CROSS-REFERENCE TO RELATED APPLICATIONS

The present application is a continuation application of International Application No. PCT/JP2012/058392, filed Mar. 29, 2012. The contents of this application are incorporated herein by reference in their entirety.

BACKGROUND OF THE INVENTION

Field of the Invention

The present invention relates to an application jig and a method of manufacturing a honeycomb structured body.

Discussion of the Background

In exhaust gases discharged from internal combustion engines of vehicles (e.g., buses, trucks, passenger cars) and construction machines, particulate matters (hereinafter, also referred to as PMs) are contained. In recent years, these PMs have raised serious problems as contaminants harmful to the environment and the human body.

To solve the problem, various filters including a honeycomb structured body made of porous ceramic have been proposed as filters for collecting PMs in exhaust gases to purify the exhaust gases.

The honeycomb structured body used includes a pillar-shaped ceramic block with a peripheral sealing material layer formed around the ceramic block.

The peripheral sealing material layer is provided for the purposes of adjusting the shape of the honeycomb structured body placed in an exhaust passage of an internal combustion engine, preventing leakage of exhaust gases from the peripheral portion of the honeycomb structured body, and enhancing the heat insulating property of the honeycomb structured body.

WO 2005/045210 discloses a method for forming a thin peripheral sealing material layer around a ceramic block, in which a ring-shaped scraper (application jig) sliding along the peripheral surface of a ceramic block is used.

According to the method disclosed in WO 2005/045210, a scraping step is performed in which a paste-like sealing material (sealing material paste) is put on the peripheral surface of a ceramic block and the ceramic block is passed through the ring-shaped scraper in a longitudinal direction so that the sealing material paste is spread over the entire peripheral surface of the ceramic block.

SUMMARY OF THE INVENTION

According to one aspect of the present invention, an application jig includes a first principal surface, a second principal surface, and an opening section. The second principal surface is provided on an opposite side of the first principal surface. The opening section penetrates from the first principal surface to the second principal surface and includes a first opening section and a second opening section. The first opening section is provided on the first principal surface side. The second opening section is provided on the second principal surface side and has a substantially constant diameter from the second principal surface toward a boundary line between the first opening section and the second opening section. The first opening section has a diameter gradually decreasing from the first principal surface toward the boundary line.

According to another aspect of the present invention, in a method of manufacturing a honeycomb structured body, an application jig is provided. The application jig includes a first principal surface, a second principal surface, and an opening section. The second principal surface is provided on an opposite side of the first principal surface. The opening section penetrates from the first principal surface to the second principal surface and includes a first opening section and a second opening section. The first opening section is provided on the first principal surface side. The second opening section is provided on the second principal surface side and has a substantially constant diameter from the second principal surface toward a boundary line between the first opening section and the second opening section. The first opening section has a diameter gradually decreasing from the first principal surface toward the boundary line. A sealing material paste is put on a peripheral surface of a pillar-shaped ceramic block. The application jig is set in such a manner that the first principal surface faces upward and the second principal surface faces downward. The ceramic block is placed inside the second opening section of the application jig. The ceramic block is passed through the opening section of the application jig so that a face defining the second opening section spreads an entire peripheral surface of the ceramic block with the sealing material paste to manufacture a honeycomb structured body with a peripheral sealing material layer formed on the peripheral surface of the ceramic block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 7A and 7B each are a side view schematically illustrating a state of spreading a sealing material paste in the scraping step.

DESCRIPTION OF THE EMBODIMENTS

Figure 1:
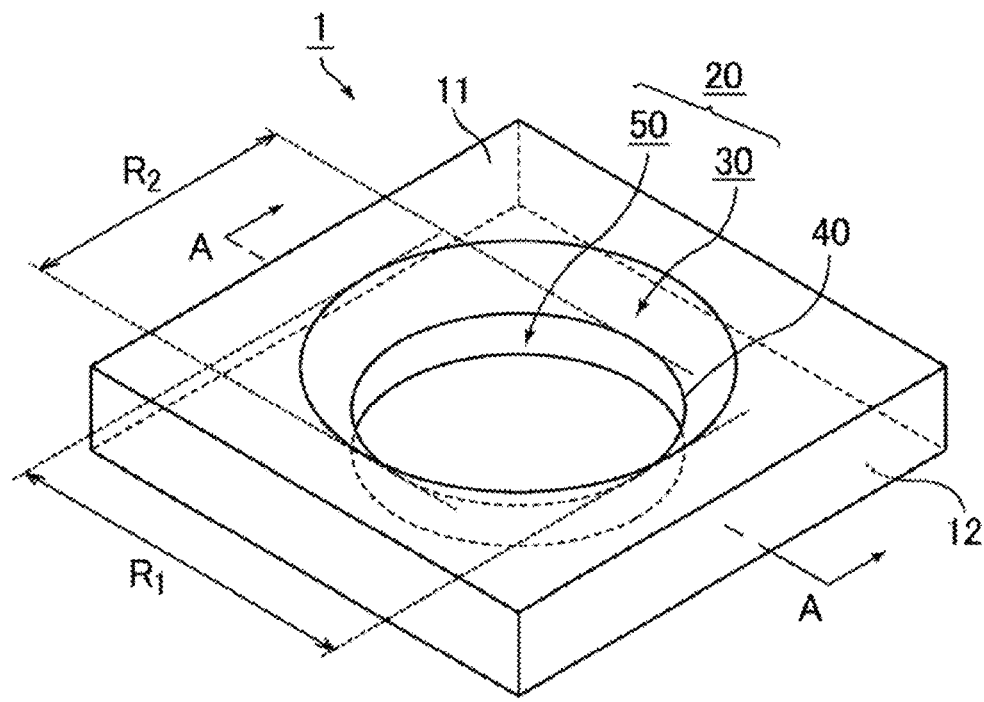
FIG. 1 is a perspective view schematically illustrating an example of an application jig according to a first embodiment of the present invention.

The embodiments will now be described with reference to the accompanying drawings, wherein like reference numerals designate corresponding or identical elements throughout the various drawings.

An application jig according to a first aspect of the embodiments of the present invention includes:

a first principal surface;

a second principal surface that is a principal surface on the opposite side of the first principal surface; and an opening section penetrating from the first principal surface to the second principal surface, wherein the opening section includes a first opening section on the first principal surface side and a second opening section on the second principal surface side, the first opening section has a diameter gradually decreasing from the first principal surface toward a boundary line between the first opening section and the second opening section, and the second opening section has a constant diameter from the boundary line toward the second principal surface.

In the application jig, the diameter of the first opening section gradually decreases from the first principal surface toward the boundary line between the first opening section and the second opening section. Such a shape is described as a shape tapered from the first principal surface toward the second principal surface.

The portion tapered from the first principal surface toward the second principal surface is herein referred to as a tapered portion.

The application jig is placed in such a manner that the first principal surface faces upward and the second principal surface faces downward, and a ceramic block with a sealing material paste put thereon was placed inside the second opening section of the application jig. When the application jig is moved in an upward direction with such setting, the sealing material paste scraped by the tapered first opening section is collected on the tapered portion. If a thin portion of the peripheral sealing material layer is present, the sealing material paste collected on the tapered portion fills the thin portion along the movement of the application jig, preventing formation of a portion where the peripheral sealing material layer is thin.

In the application jig, the diameter of the second opening section is constant from the boundary line toward the second principal surface. In other words, the shape of that portion is not tapered.

The portion not tapered is herein referred to as a straight portion.

The thickness of the peripheral sealing material layer can be determined by adjusting the distance between a face forming the second opening section and the peripheral surface of the ceramic block. The second opening section having a face formed by a straight portion enables formation of a peripheral sealing material layer having a predetermined thickness.

In other words, the application jig is suitably used for forming a thick peripheral sealing material layer over the entire peripheral surface of a ceramic block by increasing the amount of the sealing material paste put on the peripheral surface of the ceramic block on which cells are exposed.

In the application jig according to a second aspect of the embodiments of the present invention, the second opening section has a thickness of 1 to 4 mm.

If the second opening section is thicker than 4 mm, holes may be formed on the surface of the applied sealing material paste. If the second opening section is thinner than 1 mm, a portion pressing the sealing material paste onto the peripheral surface of the ceramic block is small, possibly causing variation in thickness of the peripheral sealing material layer.

If the thickness of the second opening section is within a range from 1 to 4 mm, formation of holes on the surface of the applied sealing material paste and variation in thickness of the peripheral sealing material layer are prevented.

In the application jig according to a third aspect of the embodiments of the present invention, among angles between a face forming the first opening section and a face spreading along the boundary line in a direction in parallel with the second principal surface, an angle formed inside the application jig is 65° to 85°.

If the angle is smaller than 65°, a thin portion of the peripheral sealing material layer is not well filled with the sealing material paste collected on the tapered portion, so that streaks may be formed on the surface of the applied sealing material paste along the moving direction of the application jig.

If the angle is larger than 85°, the amount of the sealing material paste collected on the tapered portion is small, possibly failing to fill a thin portion of the peripheral sealing material layer with the sealing material paste.

In the application jig according to a fourth aspect of the embodiments of the present invention, the jig is made of polyacetal, a fluororesin, polycarbonate, polypropylene, polyphenylene ether, polybutylene terephthalate, an acrylic resin, polyphenylene sulfide, or a metal coated with a resin.

These materials are hard, not like soft materials such as elastomers, and therefore, a rigid application jig can be made.

If the application jig used is made of a soft material such as elastomers, the jig may be warped in the scraping step. In such a case, the sealing material paste may be built up to form a thick portion at the end in the moving direction of the application jig. The use of a rigid application jig can prevent such a defect.

The application jig according to a fifth aspect of the embodiments of the present invention is made of polyacetal, a fluororesin, or a metal coated with a fluororesin.

These materials are rigid and have poor adhesion with the sealing material paste, so that the sealing material paste does not adhere to the application jig. As a result, uneven coating (so-called shrinkage) is not formed on the surface of the applied sealing material paste.

In the application jig according to a sixth aspect of the embodiments of the present invention, the application jig has a thickness of 10 to 20 mm.

In a case where the thickness of the application jig is within the above range, the rigidity of the application jig is enhanced.

In the application jig according to a seventh aspect of the embodiments of the present invention, a face forming the second opening section has a groove running from the boundary line toward the second principal surface.

The application jig with such a groove can form a protrusion on the peripheral sealing material layer. With the protrusion, the friction force is generated between the protrusion and a holding sealing material wound around the honeycomb structured body, enhancing the tight contact between the peripheral sealing material layer and the holding sealing material.

A method of manufacturing a honeycomb structured body according to an eighth aspect of the embodiments of the present invention includes the steps of: a sealing material putting step of putting a sealing material paste on a peripheral surface of a pillar-shaped ceramic block; and a scraping step of spreading the entire peripheral surface of the ceramic block with the sealing material paste put on the peripheral surface of the ceramic block to manufacture a honeycomb structured body with a peripheral sealing material layer formed on the peripheral surface of the ceramic block, wherein the application jig according to any one of first to seventh aspects of the embodiments of the present invention is set in such a manner that the first principal surface faces upward and the second principal surface faces downward, the ceramic block is placed inside the second opening of the application jig, and in the scraping step, the ceramic block is passed through the opening section of the application jig so that a face forming the second opening spreads the entire peripheral surface of the ceramic block with the sealing material paste.

In the method, since the application jig of the embodiments of the present invention is used in the scraping step, generation of a portion where the peripheral sealing material layer is not formed is prevented, so that the peripheral sealing material layer having a predetermined thickness is formed over the entire peripheral surface of a ceramic block in the manufactured honeycomb structured body.

In the method according to a ninth aspect of the embodiments of the present invention, in the scraping step, the application jig with the first principal surface facing upward and the second principal surface facing downward is moved in an upward direction.

In a case where the moving direction of the application jig is set as above, the application jig is moved in a direction where the opening size of the tapered portion is increased, so that the scraped sealing material paste can be collected on the tapered portion. If a thin portion of the peripheral sealing material layer is present, the sealing material paste collected on the tapered portion fills the thin portion along with the movement of the application jig, preventing formation of a portion where the peripheral sealing material layer is thin.

In the method according to a tenth aspect of the embodiments of the present invention, the ceramic block is placed in a manner as to set a spacing between the peripheral surface of the ceramic block and the face forming the second opening section constant.

Placing the ceramic block at such a position enables formation of the peripheral sealing material layer having constant thickness.

In the method according to an eleventh aspect of the embodiments of the present invention, the ceramic block is placed in a manner as to set a spacing between the peripheral surface of the ceramic block and the face forming the second opening section not constant.

Placing the ceramic block at such a position enables formation of the peripheral sealing material layer having a thickness different from part to part.

In the method according to a twelfth aspect of the embodiments of the present invention, the spacing between the peripheral surface of the ceramic block and the face forming the second opening section of the application jig is 0.40 to 0.70 mm.

Determining the distance between the peripheral surface of the ceramic block and the face forming the second opening section of the application jig can control the thickness of the peripheral sealing material layer.

Setting the distance within a range from 0.40 to 0.70 mm enables formation of a comparatively thick peripheral sealing material layer having a thickness of 0.40 to 0.70 mm on the peripheral surface of the ceramic block.

In the method according to a thirteenth aspect of the embodiments of the present invention, the ceramic block is placed in a manner such that positions of the center of the ceramic block and the center of the opening section of the application jig are matched.

In the method according to a fourteenth aspect of the embodiments of the present invention, a positioning jig is used to place the ceramic block, the positioning jig being capable of determining the positions of the ceramic block and the application jig by matching positions of the center of the ceramic block and the center of the opening section of the application jig.

Matching the positions of the center of the ceramic block and the center of the opening section of the application jig enables formation of a peripheral sealing material layer having a predetermined thickness at a predetermined position.

The use of such a positioning jig facilitates positioning, enabling easier formation of the peripheral sealing material layer controlled to have a predetermined thickness over the entire periphery of the honeycomb structured body.

In the method according to a fifteenth aspect of the embodiments of the present invention, the ceramic block is manufactured through a step of manufacturing a rectangular pillar-shaped honeycomb fired body having a large number of cells for passing gas therethrough disposed in parallel in a longitudinal direction and a cell wall provided to separate the cells, a step of binding a plurality of the honeycomb fired bodies to manufacture a rectangular pillar-shaped honeycomb aggregated body, and a step of grinding the peripheral surface of the honeycomb aggregated body; and cells cut in the grinding are exposed on the peripheral surface of the ceramic block.

On the ceramic block manufactured by the above method, cells cut in the grinding are exposed. In the above method for manufacturing a honeycomb structured body, the peripheral sealing material layer can be thickened and can fill all the exposed cells, preventing formation of a portion where the peripheral sealing material layer is not formed on the peripheral surface of the ceramic block.

In the method according to a sixteenth aspect of the embodiments of the present invention, the ceramic block is a single pillar-shaped honeycomb fired body including a large number of cells disposed in parallel in a longitudinal direction and a cell wall provided to separate the cells.

The use of the application jig of the embodiments of the present invention enables favorable application of a sealing material paste also to a ceramic block formed of a single honeycomb fired body.

The method according to a seventeenth aspect of the embodiments of the present invention includes the steps of:

a first sealing material paste putting step of putting a first sealing material paste on the peripheral surface of the ceramic block;

a first scraping step of spreading the entire peripheral surface of the ceramic block with the first sealing material paste;

a first drying step of drying the first sealing material paste until the first sealing material paste is solidified to form a first peripheral sealing material layer;

a second sealing material paste putting step of putting a second sealing material paste on the first peripheral sealing material layer;

a second scraping step of spreading the entire first peripheral sealing material layer with the second sealing material paste; and a second drying step of drying the second sealing material paste until the second sealing material paste is solidified to form a second peripheral sealing material layer.

Since the sealing material paste contains moisture, a drying step for removing the moisture contained in the sealing material paste is commonly performed after the scraping step.

In a case where the applied sealing material paste is thick, cracks may occur during the drying step.

Even if cracks occur in the first drying step, the cracks can be filled in the second sealing material paste putting step and the second scraping step. The subsequent second drying step enables formation of a peripheral sealing material layer with a surface in an excellent condition, namely, with a surface having no cracks.

In the following, a specific description is given on embodiments of the present invention. The present invention is not limited to the below embodiments, and the embodiments may be employed in appropriate combination as long as the combination is not beyond the spirit of the present invention.

First Embodiment

A description is given on a first embodiment that is one embodiment of the application jig and the method for manufacturing a honeycomb structured body of the present disclosure.

First, an application jig according to the first embodiment of the present invention is described with reference to drawings.

FIG. 1 is a perspective view schematically illustrating one example of an application jig according to the first embodiment of the present invention.

An application jig 1 illustrated in FIG. 1 is a plate-like jig having a first principal surface 11 and a second principal surface 12 that is a principal surface on the opposite side of the first principal surface 11.

The application jig 1 has an opening section 20 in the central portion thereof.

The opening section 20 includes a first opening section 30 on the first principal surface 11 side and a second opening section 50 on the second principal surface 12 side.

The boundary between the first opening section 30 and the second opening section 50 is shown as a boundary line 40.

The first opening section 30 and the second opening section 50 each have a circular cross-sectional shape when cut in a plane parallel with the second principal surface 12.

The first opening section 30 has a tapered shape so that the diameter thereof is decreased from the first principal surface 11 toward the boundary line 40.

In FIG. 1, the diameter of the first opening section 30 positioned on the same plane as the first principal surface 11 is indicated by $R_1$.

The diameter of the second opening section is constant from the boundary line 40 toward the second principal surface 12.

In FIG. 1, the diameter of the second opening section 50 is indicated by $R_2$.

Figure 2:
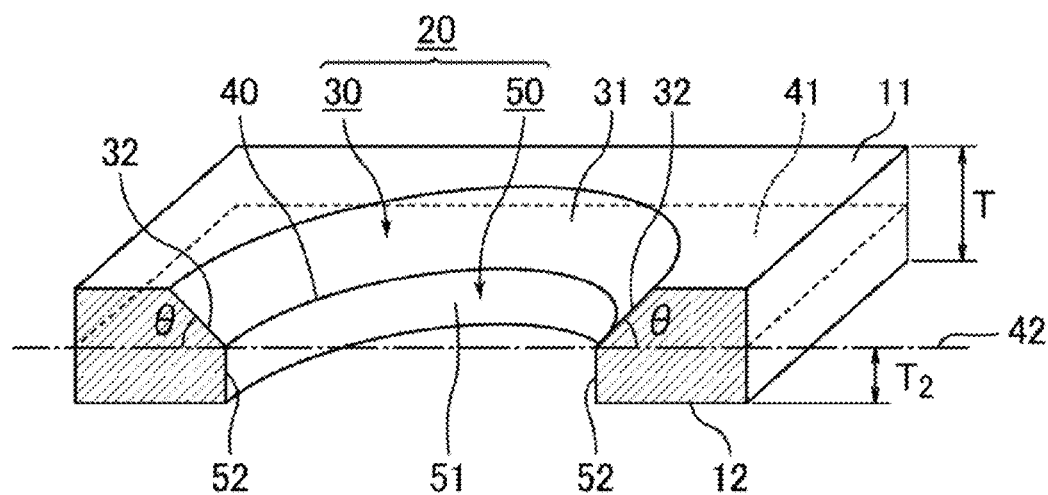
FIG. 2 is an A-A line cross-sectional view of the application jig illustrated in FIG. 1.

FIG. 2 is an A-A line cross-sectional view of the application jig illustrated in FIG. 1.

FIG. 2 shows a face 31 forming the first opening section 30 and a face 51 forming the second opening section 50.

The cross-sectional view shown in FIG. 2 is taken along a plane that passes through the center of the second opening section 50 and is orthogonal to the first principal surface 11 and the second principal surface 12. The intersection of the cross section and the face 31 forming the first opening section is a line 32. The angle formed by the line 32 and a line 41 described later is a taper angle θ.

The first opening section 30 is inclined from the first principal surface 11 toward the second principal surface 12 to have a tapered shape. The portion having a tapered shape is also referred to as a tapered portion (tapered portion 32).

In the cross-sectional shape in FIG. 2, a line 52 corresponding to the face 51 forming the second opening section 50 is running in the vertical direction from the boundary line 40 toward the second principal surface 12.

The running direction of the line 52 indicates that the shape of the second opening section 50 is constant from the boundary line 40 toward the second principal surface 12 without taper. The portion corresponding to the line 52 running in the vertical direction is also referred to as a straight portion.

The inclination of the tapered portion 32 is an angle indicated by θ in FIG. 2. The inclination θ of the tapered portion 32 is an angle formed inside the application jig 1 among the angles between a line 42 in the cross-sectional view illustrated in FIG. 2 and the tapered portion 32, the line 42 corresponding to a hypothetical plane 41 spreading along the boundary line 40 in a direction in parallel with the second principal surface 12.

The angle θ is the same as the angle formed inside the application jig 1 among angles formed between the face 31 forming the first opening section 30 and the plane 41 spreading along the boundary line 41 in a direction in parallel with the second principal surface 12.

The angle θ in the application jig of the present embodiment is set to 65° to 85°. The angle θ is more preferably set to 70° to 80°.

The thickness of the application jig 1 is indicated by T in FIG. 2 and is substantially the same as the distance between the first principal surface 11 and the second principal surface 12.

The thickness T of the application jig 1 of the present embodiment is set to 10 to 20 mm.

The thickness of the second opening section 50 is indicated by $T_2$ in FIG. 2 and is substantially the same as the length of the straight portion 52.

The thickness $T_2$ of the second opening section 50 in the application jig of the present embodiment is set to 1 to 4 mm. The thickness $T_2$ is more preferably set to 2 to 3 mm.

Adjustment of the angle θ and the thickness $T_2$ improves the surface condition of the applied peripheral sealing material layer. Preferable combinations of the angle θ and the thickness $T_2$ include a combination of the angle θ of 75° and the thickness $T_2$ of 1 to 3 mm and a combination of the angle θ of 70° to 80° and the thickness $T_2$ of 2 mm.

A more preferable combination of the angle θ and the thickness $T_2$ is a combination of the angle θ of 75° and the thickness $T_2$ of 2 mm.

The material of the application jig is not particularly limited as long as it has high rigidity. Preferable materials include polyacetal, fluororesins, polycarbonate, polypropylene, polyphenylene ether, polybutylene terephthalate, acrylic resins, polyphenylene sulfide, or metals coated with resins.

Among these, particularly preferred are polyacetal, fluororesins, and metals coated with fluororesins.

In a case where the material of the application jig is a metal coated with a resin, the face 31 forming the first opening section 30 and the face 51 forming the second opening section 50, which are faces contacting the sealing material paste, are preferably coated with a resin. The other faces of the application jig may or may not be coated with a resin.

Next, a description is given on a honeycomb structured body to be manufactured by the method for manufacturing a honeycomb structured body of the present embodiment with reference to drawings.

Figure 3:
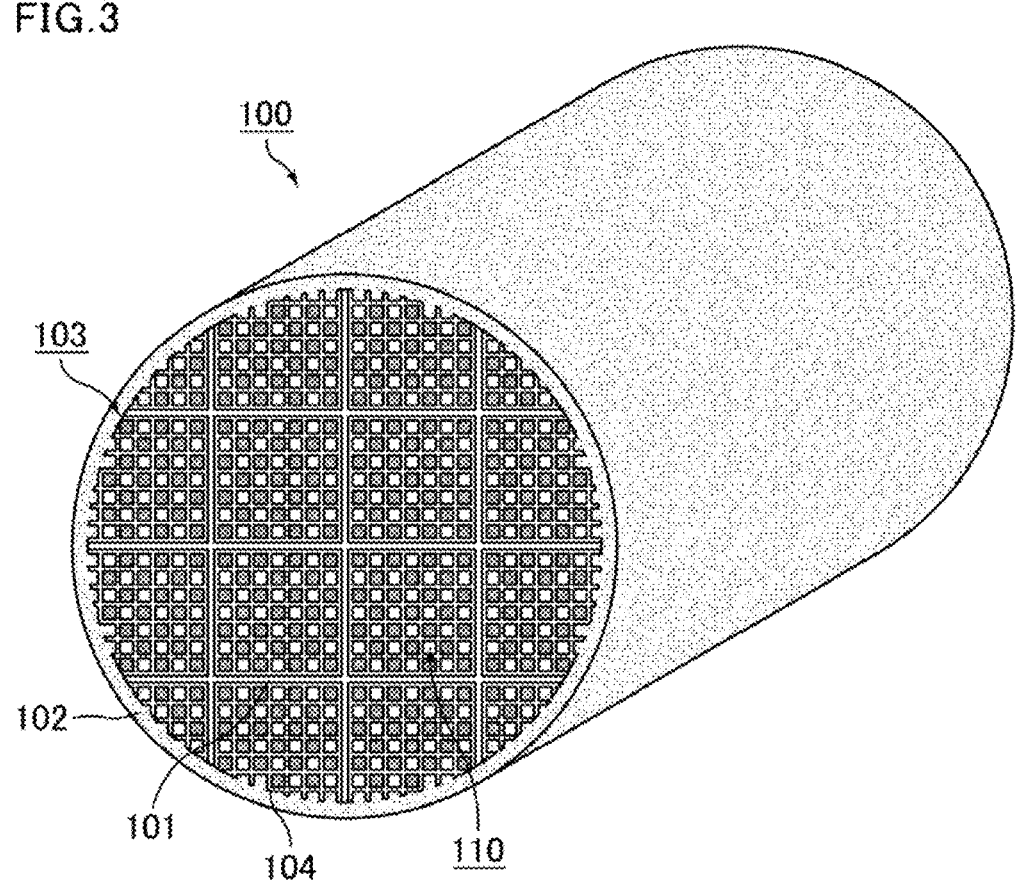
FIG. 3 is a perspective view schematically illustrating a honeycomb structured body.

FIG. 3 is a perspective view schematically illustrating a honeycomb structured body.

Figure 4A:
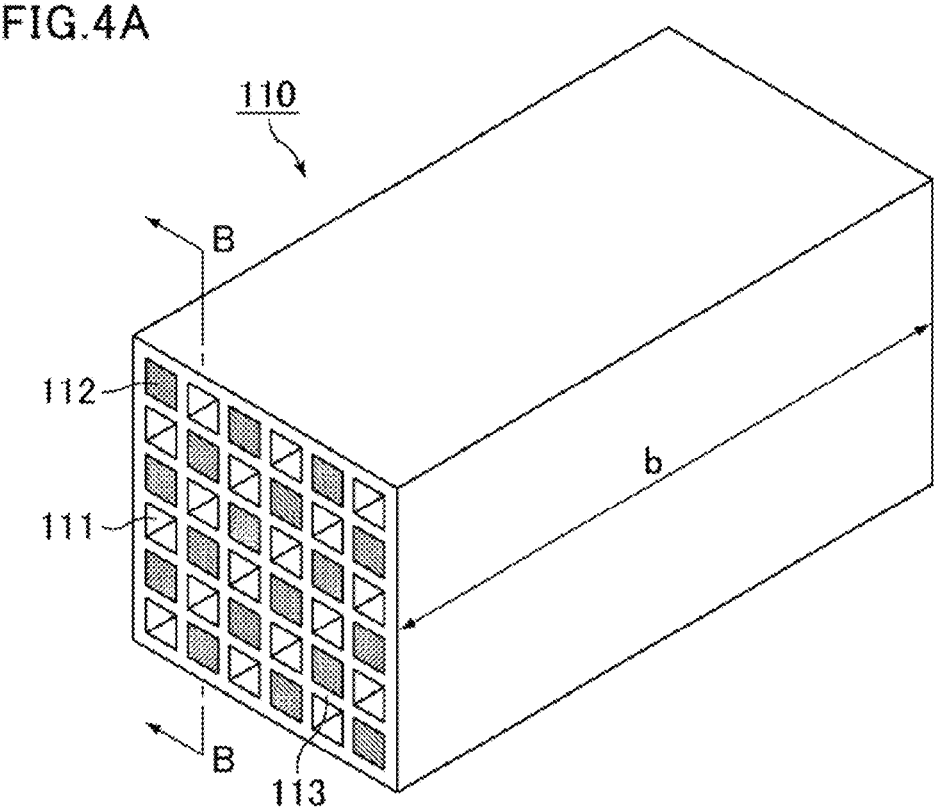
FIG. 4A is a perspective view schematically illustrating one example of a honeycomb fired body forming the honeycomb structured body.
Figure 4B:
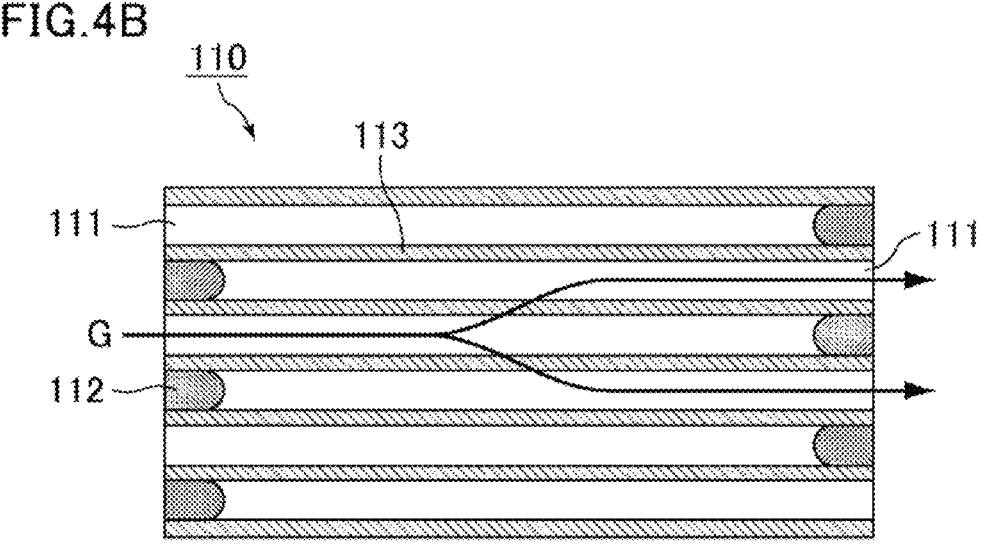
FIG. 4B is a B-B line cross-sectional view thereof.

In a honeycomb structured body 100 illustrated in FIG. 3, a plurality of honeycomb fired bodies 110 made of porous silicon carbide in a shape as illustrated in FIGS. 4A and 4B are bonded by an adhesive layer 101 to form a ceramic block 103, and the ceramic block 103 has a peripheral sealing material layer 102 formed on a peripheral surface 104.

FIG. 4A is a perspective view schematically illustrating one example of a honeycomb fired body forming a honeycomb structured body, and FIG. 4B is a B-B line cross-sectional view thereof.

In the honeycomb fired body 110 illustrated in FIGS. 4A and 4B, a large number of cells 111 are disposed in parallel in a longitudinal direction (direction indicated by b in FIG. 4A) with a cell wall 113 interposed therebetween. Either one end of each cell 111 is sealed with a plug 112. With such a configuration, exhaust gases G having flowed into one cell with an opening on one end face surely pass through the cell wall 113 separating the cells 111, and flows out from another cell 111 with an opening on the other end face.

In such a case, the cell wall 113 functions as a filter capturing PMs and the like.

Figure 5:
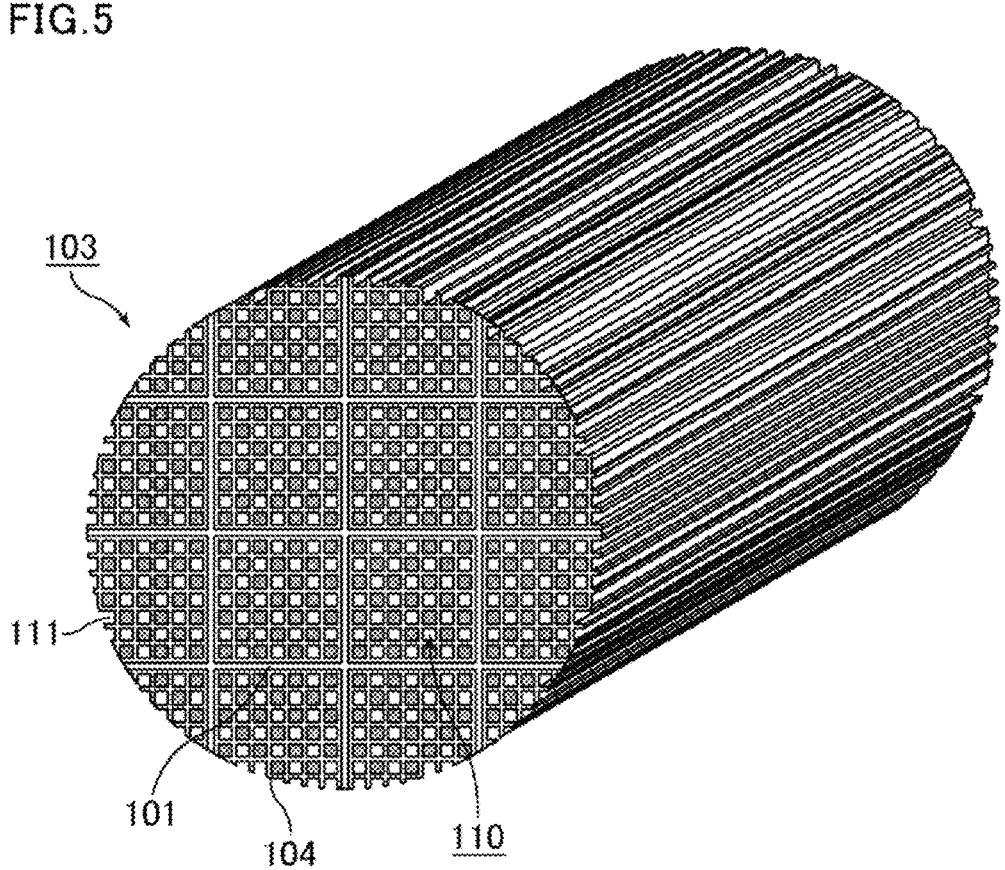
FIG. 5 is a perspective view schematically illustrating a ceramic block manufactured by grinding the periphery of a honeycomb aggregated body including a plurality of the honeycomb fired bodies bound to one another.

FIG. 5 is a perspective view schematically illustrating a ceramic block manufactured by grinding the periphery of a honeycomb aggregated body including a plurality of honeycomb fired bodies bonded to one another.

The ceramic block 103 illustrated in FIG. 5 is manufactured by forming a rectangular pillar-shaped honeycomb aggregated body including 16 pieces of the honeycomb fired bodies 110 bonded to one another, and then grinding the peripheral surface of the honeycomb aggregated body into a round pillar shape. The cells 111 of the honeycomb fired body 110 are exposed on the ground surface.

In the present embodiment, the peripheral surface of the ceramic block is a side face of the ceramic block in a case where the shape of the ceramic block resulting from the grinding treatment is regarded to be a solid having a smooth side face. In the case of the ceramic block 103 illustrated in FIG. 5, the peripheral surface 104 is a side face of the ceramic block 103 regarded to be a cylinder solid.

The honeycomb structured body 100 illustrated in FIG. 3 is manufactured by forming the peripheral sealing material layer 102 on the peripheral surface 104 of the ceramic block 103 illustrated in FIG. 5. The peripheral sealing material layer 102 preferably has an enough thickness to fill the cells exposed on the peripheral surface 104 of the ceramic block 103. Specifically, the peripheral sealing material layer preferably has a thickness of 0.4 to 0.7 mm.

The peripheral surface of the honeycomb structured body 100 illustrated in FIG. 3 is smooth as the cells exposed on the peripheral surface 104 of the ceramic block 103 are filled by the peripheral sealing material layer.

Next, a description is given on a method for manufacturing the honeycomb structured body according to the first embodiment of the present invention.

In particular, a method for forming a peripheral sealing material layer on a peripheral surface of a ceramic block is described with reference to drawings.

The method for manufacturing a honeycomb structured body of the present embodiment includes the steps of:

a sealing material putting step of putting a sealing material paste on a peripheral surface of a pillar-shaped ceramic block; and a scraping step of spreading the entire peripheral surface of the ceramic block with the sealing material paste put on the peripheral surface of the ceramic block to manufacture a honeycomb structured body with a peripheral sealing material layer formed on the peripheral surface of the ceramic block, wherein the application jig of the embodiment of the present invention is set in such a manner that the first principal surface faces upward and the second principal surface faces downward, the ceramic block is placed inside the second opening of the application jig, and in the scraping step, the ceramic block is passed through the opening section of the application jig so that a face forming the second opening spreads the entire peripheral surface of the ceramic block with the sealing material paste.

First, a pillar-shaped ceramic block is prepared.

In the present embodiment, a cylindrical ceramic block as illustrated in FIG. 5 is prepared.

A method for manufacturing a ceramic block is described later.

Next, a sealing material paste is put on the peripheral surface of the ceramic block.

The method for putting a sealing material paste on the peripheral surface is not particularly limited. For example, a brush or spatula is used for putting a sealing material paste on the entire peripheral surface of the ceramic block.

At this stage, the thickness of the sealing material paste put on the peripheral surface may vary.

The amount of the sealing material paste may be set to a sufficient amount in consideration of the thickness of a peripheral sealing material layer to be formed.

The material of the sealing material paste is not particularly limited, and examples thereof include inorganic binders, organic binders, inorganic fibers, inorganic particles and combinations of these.

Next, the scraping step is carried out for spreading the entire peripheral surface of the ceramic block with the sealing material paste put on the peripheral surface.

In the scraping step of the present embodiment, a positioning jig and the application jig according to the first embodiment of the present invention are used.

The peripheral surface of the ceramic block has the same shape as the second opening section of the application jig according to the first embodiment of the present invention.

Figure 6A:
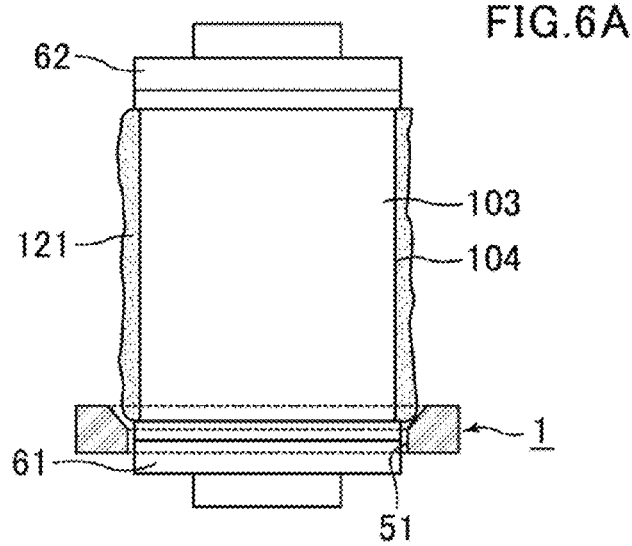
FIGS. 6A, 6B, and 6C each are a side view schematically illustrating a scraping step.
Figure 6B:
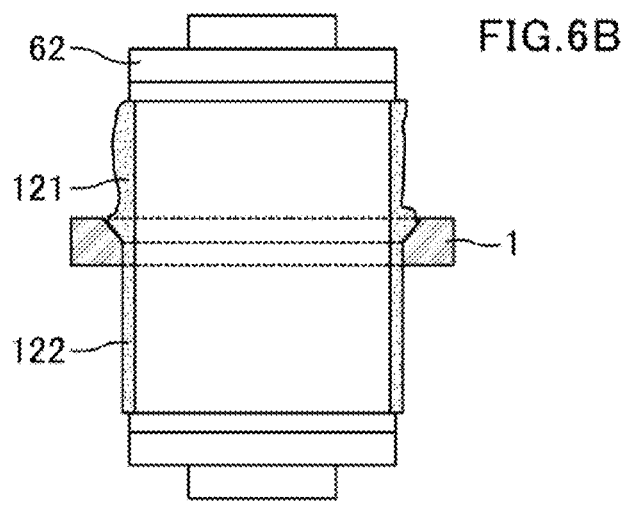
Figure 6C:
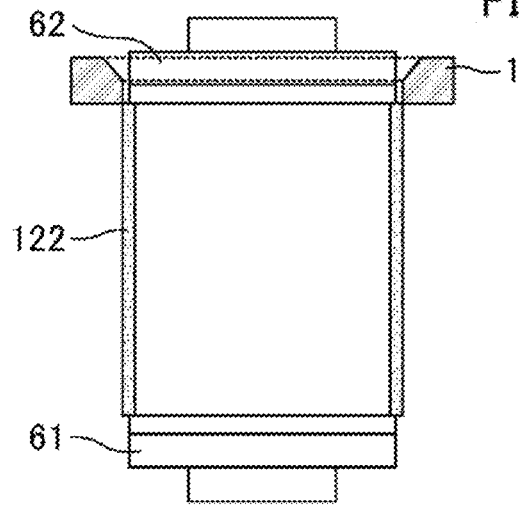

FIGS. 6A, 6B, and 6C each are side view schematically illustrating the scraping step.

In the scraping step, the ceramic block is held by a positioning jig for positioning thereof, and the ceramic block is passed through the opening section of the application jig so that the face forming the opening section of the application jig spreads the entire peripheral surface of the ceramic block with the sealing material paste.

FIG. 6A illustrates a first stage of the scraping step.

The application jig 1 is placed in such a manner that the first principal surface faces upward and the second principal surface faces downward.

The positioning jig includes a positioning lower jig 61 and a positioning upper jig 62. The positioning lower jig 61 and the positioning upper jig 62 each have an outer diameter smaller than the diameter ($R_2$ in FIG. 1) of the second opening section of the application jig 1. With such a configuration, the application jig 1 can vertically move to overlap with the positioning lower jig 61 as illustrated in FIG. 6A.

At the first stage of the scraping step, the ceramic block 103 is placed on the positioning lower jig 61. Then, the positioning upper jig 62 is placed on the top face of the ceramic block 103. The ceramic block 103 is sandwiched by the positioning lower jig 61 and the positioning upper jig 62 to be fixed.

Here, the position of the ceramic block 103 is set to a predetermined position by a guide provided on the positioning lower jig 61 and the positioning upper jig 62. The guide is designed to set the ceramic block 103 in such a manner as to match the positions of the center of the ceramic block and the center of the opening section 20 of the application jig 1.

The center of the ceramic block refers to the center of an end face of the ceramic block, namely, the center of a circle that is a shape of the bottom face and the top face of the ceramic block.

The position of the center of the opening section refers to the position of the center of a circle forming the opening section.

At this stage, the application jig 1 is overlapped with the positioning lower jig 61, and therefore is not in contact with the sealing material paste 121.

The sealing material paste 121 is put on the peripheral surface 104 of the ceramic block 103, having variation in thickness.

FIG. 6B illustrates a stage of spreading the peripheral surface of the ceramic block with the sealing material paste by moving the application jig.

Along with the upward movement of the application jig 1, the face 51 forming the second opening section of the application jig 1 spreads the peripheral surface 104 of the ceramic block 103 with the sealing material paste 121.

The surface of the sealing material paste 122 is smooth in a portion where the application jig 1 has passed (i.e., portion below the application jig 1). The distance between the face 51 forming the second opening section 50 and the peripheral surface 104 of the ceramic block 103 is constant, which means that the thickness of the sealing material paste 122 is constant.

In the following, spreading of the sealing material paste with the application jig is more specifically described.

FIGS. 7A and 7B each are a side view schematically illustrating a state of spreading the sealing material paste in the scraping step.

Having a cross-sectional shape illustrated in FIG. 2, the application jig 1 has the tapered portion 32 and the straight portion 52.

When the application jig 1 is moved in an upward direction, the straight portion 52 contacts the sealing material paste.

The thickness of the sealing material paste is adjusted to a thickness corresponding to the distance between the straight portion 52 and the peripheral surface 104 of the ceramic block, that is, a distance indicated by a bidirectional arrow X in FIG. 7A.

The distance indicated by the bidirectional arrow X is the same as the spacing between the face 51 forming the second opening section 50 and the peripheral surface 104 of the ceramic block, and the spacing is 0.40 to 0.70 mm.

As described above, the center of the opening section 20 of the application jig 1 and the center of the ceramic block 103 are matched. Accordingly, the thickness of the sealing material paste is adjusted to be constant throughout the peripheral surface 104 of the ceramic block 103.

Here, the sealing material paste 121 has variation in thickness before the passage of the application jig, and includes a portion thinner than the distance X (portion indicated by Y in FIG. 7A) and a portion thicker than the distance X (portion indicated by Z in FIG. 7A).

The amount of the sealing material paste put on the peripheral surface is commonly excessive, so that thickness of the sealing material paste is thicker than the distance X in many portions. The scraped sealing material paste 123 is therefore collected on the tapered portion 32 along the inclination thereof.

The sealing material paste 123 collected on the tapered portion 32 serves as a filler for filling the portion Y where the sealing material paste is thin. As a result, after the passage of the application jig 1 through the portion Y, as illustrated in FIG. 7B, the sealing material paste 122 has a predetermined thickness (thickness indicated by the distance X).

FIG. 6C illustrates a stage after the scraping step.

The sealing material paste 122 has a smooth surface having a constant thickness throughout the entire surface when the application jig 1 is moved until being overlapped with the positioning upper jig 62.

After the movement of the application jig 1, the ceramic block is released from the positioning jig. Thus, a ceramic block with a sealing material paste uniformly spread on the entire peripheral surface is obtained, thereby completing the scraping step.

The sealing material paste spread on the peripheral surface of the ceramic block is subjected to the drying step in which the sealing material paste is dried to be solidified, so as to be formed into a peripheral sealing material layer.

In the drying step, the ceramic block with the sealing material paste spread on the peripheral surface is dried in a drying furnace at a temperature of 110° C. to 130° C. for 9 to 11 minutes.

In the present embodiment, the peripheral sealing material layer is preferably formed by performing twice the sealing material paste putting step, the scraping step, and the drying step.

The sealing material paste putting step, the scraping step, and the drying step described above are the first performance thereof, and respectively referred to as a first sealing material putting step, a first scraping step, and a first drying step. The sealing material paste put on in the first sealing material paste putting step is also referred to as a first sealing material.

The peripheral sealing material layer resulting from the above process is referred to as a first peripheral sealing material layer.

The first peripheral sealing material layer resulting from the first drying step may have cracks on its surface. The second performance of the sealing material paste putting step and the scraping step fill the cracks formed to give a peripheral sealing material layer having an excellent surface condition.

The sealing material paste putting step, the scraping step, and the drying step in the second performance are respectively referred to as a second sealing material paste putting step, a second scraping step, and a second drying step.

A peripheral sealing material layer resulting from the above procedure is referred to as a second peripheral sealing material layer.

Specific procedures of the second sealing material paste putting step, the second scraping step, and the second drying step are not described here as they are similar to the procedure of the first sealing material paste putting step, the first scraping step, and the first drying step.

A sealing material paste (second sealing material paste) put on the first peripheral sealing material layer is subjected to the scraping step and the drying step, thereby giving a ceramic block having a second peripheral sealing material layer on the surface. A ceramic block having a peripheral sealing material layer formed thereon is formed into a honeycomb structured body to be manufactured by a method for manufacturing a honeycomb structured body of the present embodiment.

In the following, a description is given on a method for manufacturing a pillar-shaped ceramic block.

A case where the ceramic powder used as a material of the ceramic block is silicon carbide powder is exemplified here.

(1) A molding step for manufacturing a honeycomb molded body is performed in which a wet mixture containing ceramic powder and a binder is extrusion-molded.

First, a wet mixture for manufacturing a honeycomb molded body is prepared by mixing silicon carbide powders having different average particle sizes as ceramic powder, an organic binder, a liquid plasticizer, a lubricant, and water.

Next, the wet mixture is charged into an extrusion molding apparatus to be extruded into a honeycomb molded body in a predetermined shape.

At this time, a die that forms a cross-sectional shape having a cell structure (shape and arrangement of cells) as illustrated in FIGS. 4A and 4B is used for manufacturing a honeycomb molded body.

(2) The honeycomb molded body is cut at a predetermined length and dried in a dryer (e.g., microwave dryer, hot air dryer, dielectric dryer, decompression dryer, vacuum dryer, freeze dryer). Then, a plugging step is performed in which predetermined cells are filled with a plug material paste that is formed into a plug, to be sealed.

Here, the above wet mixture may be used as a plug material paste.

(3) After a degreasing step in which the honeycomb molded body is heated in a degreasing furnace so that organic substances therein are removed, the degreased honeycomb molded body is sent to a firing furnace. As a result of the firing step, a rectangular pillar-shaped honeycomb fired body as illustrated in FIGS. 4A and 4B are manufactured.

The plug material paste in an end portion of each cell is fired by heating to be formed into a plug.

Conditions conventionally employed for manufacturing a honeycomb fired body may be employed for the cutting step, the drying step, the plugging step, the degreasing step, and the firing step.

(4) A bonding step is performed in which a plurality of honeycomb fired bodies are sequentially stacked and bonded by an adhesive paste on a supporting stand, thereby manufacturing a honeycomb aggregated body including a stack of a plurality of honeycomb fired bodies.

The adhesive paste used contains, for example, an inorganic binder, an organic binder, and inorganic particles. The adhesive paste may further contain inorganic fibers and/or whisker.

(5) The honeycomb aggregated body is heated so that the adhesive paste is solidified to form an adhesive layer.

Conditions conventionally employed for manufacturing a honeycomb structured body may be employed for solidification of the adhesive paste by heating.

(6) The peripheral surface of the honeycomb aggregated body is ground.

Specifically, the peripheral surface of the honeycomb aggregated body is ground with a diamond cutter, thereby manufacturing a ceramic block having a substantially round pillar shape.

On the peripheral surface of the ceramic block, cells cut by the grinding are exposed.

On the peripheral surface of the ceramic block manufactured by the above steps, a peripheral sealing material layer is formed, so that a honeycomb structured body is manufactured.

In the following, the effects exerted by the application jig and the method for manufacturing a honeycomb structured body according to the first embodiment are listed.

(1) In the application jig of the present embodiment, the diameter of the first opening section is gradually decreasing from the first principal surface toward the boundary line between the first opening section and the second opening section. In other words, the application jig has a tapered portion.

The application jig is set in such a manner that the first principal surface faces upward and the second principal surface faces downward. A ceramic block with a sealing material paste put thereon is set inside the second opening section of the application jig. When the application jig is moved in an upward direction, the sealing material paste is scraped by the first opening section having a tapered shape to be collected on the tapered portion. If a thin portion of the peripheral sealing material layer is present, the sealing material paste collected on the tapered portion fills the thin portion along with the movement of the application jig, preventing formation of a portion where the peripheral sealing material layer is thin.

(2) In the application jig of the present embodiment, the diameter of the second opening section is constant from the boundary line toward the second principal surface. In other words, the application jig has a straight portion.

In a case where a face forming the second opening section is a straight portion, a peripheral sealing material layer set to have a predetermined thickness can be formed.

The application jig is therefore suitable for forming a thick peripheral sealing material layer throughout the peripheral surface of the ceramic block by increasing the amount of the sealing material paste put on the peripheral surface of the ceramic block on which cells are exposed.

(3) In the application jig of the present embodiment, the second opening section has a thickness of 1 to 4 mm.

If the second opening section is thicker than 4 mm, holes may be formed on the surface of the spread sealing material paste. If the second opening section is thinner than 1 mm, a portion pressing the sealing material paste to the peripheral surface of the ceramic block is small, possibly causing variation in thickness of the peripheral sealing material layer.

If the thickness of the second opening section is set to 1 to 4 mm, formation of holes on the surface of the spread sealing material paste is prevented, and variation in thickness of the peripheral sealing material layer is also prevented.

(4) In the application jig of the present embodiment, among angles between a face forming the first opening section and a face spreading along the boundary line in a direction in parallel with the second principal surface, an angle θ formed inside the application jig is 65° to 85°.

If the angle θ is smaller than 65°, a thin portion of the peripheral sealing material layer is not well filled with the sealing material paste collected on the tapered portion, so that streaks may be formed on the spread sealing material paste along the moving direction of the application jig.

If the angle θ is larger than 85°, the amount of the sealing material paste collected on the tapered portion is small, possibly failing to fill a thin portion of the peripheral sealing material layer with the sealing material paste.

(5) The application jig of the present embodiment is made of polyacetal, a fluororesin, polycarbonate, polypropylene, polyphenylene ether, polybutylene terephthalate, an acrylic resin, polyphenylene sulfide, or a metal coated with a resin.

These materials are hard, not like soft materials such as elastomers, and therefore, a rigid application jig can be made.

If the used application jig is made of a soft material such as elastomers, the jig may be warped in the scraping step. In such a case, the sealing material paste may be built up to form a thick portion at the end in the moving direction of the application jig. The use of a rigid application jig can prevent such a defect.

In a case where the application jig is formed of polyacetal, a fluororesin, or a metal coated with a fluororesin, since these materials are rigid and have poor adhesion with the sealing material paste, so that the sealing material paste does not adhere to the application jig. As a result, uneven coating (so-called shrinkage) is not formed on the surface of the applied sealing material paste.

(6) The application jig of the present embodiment has a thickness of 10 to 20 mm.

In a case where the thickness of the application jig is within the above range, the rigidity of the application jig is enhanced.

(7) In the method for manufacturing a honeycomb structured body of the present embodiment, the application jig of the present embodiment is placed in such a manner that the first principal surface faces upward and the second principal surface faces downward. Next, a ceramic block is placed inside the second opening section of the application jig. In the scraping step, the ceramic block is passed through the opening section of the application jig so that the face forming the second opening section of the application jig spreads the entire peripheral surface of the ceramic block with the sealing material paste.

Since the application jig of the present embodiment is used in the scraping step, generation of a portion where the peripheral sealing material layer is not formed is prevented and the peripheral sealing material layer having a predetermined thickness is formed on the entire peripheral surface of the ceramic block in the manufactured honeycomb structured body.

(8) In the method for manufacturing a honeycomb structured body of the present embodiment, in the scraping step, the application jig set in such a manner that the first principal surface faces upward and the second principal surface faces downward is moved in an upward direction.

In a case where the moving direction of the application jig is set in this manner, the application jig is moved in a direction where the opening diameter of the tapered portion increases. In such a case, the scraped sealing material paste is collected on the tapered portion. If a thin portion of the peripheral sealing material layer is present, the sealing material paste collected on the tapered portion fills the thin portion of the peripheral sealing material layer along with the movement of the application jig, preventing formation of a portion where the peripheral sealing material layer is thin.

(9) In the method for manufacturing a honeycomb structured body of the present embodiment, the ceramic block is placed at a position where the spacing between the peripheral surface of the ceramic block and the face forming the second opening section of the application jig is constant.

Placing the ceramic block at such a position enables formation of the peripheral sealing material layer having a constant thickness.

(10) In the method for manufacturing a honeycomb structured body of the present embodiment, the spacing between the peripheral surface of the ceramic block and the face forming the second opening section of the application jig is 0.40 to 0.70 mm.

Setting the spacing within a range from 0.40 to 0.70 mm enables formation of a relatively thick peripheral sealing material layer having a thickness of 0.40 to 0.70 mm on the peripheral surface of the ceramic block.

(11) In the method for manufacturing a honeycomb structured body of the present embodiment, for placement of the ceramic block, a positioning jig is used which can set the positions of the ceramic block and the application jig in such a manner as to match the positions of the center of the ceramic block and the center of the opening section of the application jig.

Matching the positions of the center of the ceramic block and the center of the opening section of the application jig enables formation of the peripheral sealing material layer having a predetermined thickness at a predetermined position.

The use of such a positioning jig facilitates positioning, enabling easier formation of the peripheral sealing material layer controlled to have a predetermined thickness over the entire periphery of the honeycomb structured body.

(12) In the method for manufacturing a honeycomb structured body of the present embodiment, the ceramic block is manufactured by the steps of: manufacturing a rectangular pillar-shaped honeycomb fired body in which a large number of cells for passing gases therethrough are disposed in parallel in a longitudinal direction and a cell wall is provided to separate the cells; binding a plurality of the honeycomb fired bodies to form a rectangular pillar-shaped honeycomb aggregated body; and grinding the peripheral surface of the honeycomb aggregated body.

On the peripheral surface of the ceramic block, cells cut in the grinding processing are exposed.

In the ceramic block manufactured by the above method, cells cut by the grinding are exposed. In the method for manufacturing a honeycomb structured body of the present embodiment, the peripheral sealing material layer is thickened to fill all the exposed cells, preventing generation of a portion where the peripheral sealing material layer is not formed on the peripheral surface of the ceramic block.

(13) The method for manufacturing a honeycomb structured body of the present embodiment includes the steps of:

a first sealing material paste putting step of putting a first sealing material paste on the peripheral surface of the ceramic block;

a first scraping step of spreading the entire peripheral surface of the ceramic block with the first sealing material paste;

a first drying step of drying the first sealing material paste until the first sealing material paste is solidified to form a first peripheral sealing material layer;

a second sealing material paste putting step of putting a second sealing material paste on the first peripheral sealing material layer;

a second scraping step of spreading the entire first peripheral sealing material layer with the second sealing material paste; and a second drying step of drying the second sealing material paste until the second sealing material paste is solidified to form a second peripheral sealing material layer.

In the above method, even if cracks occur in the first drying step, the cracks can be filled in the second sealing material paste putting step and the second scraping step. The subsequent second drying step enables formation of a peripheral sealing material layer having an excellent surface condition, that is, having a surface with no cracks.

EXAMPLES

The following more specifically describes examples disclosing the application jig and the method for manufacturing a honeycomb structured body of the first embodiment of the present invention. It is to be noted that the present invention is not limited only to these examples.

Example 1

Manufacturing of Ceramic Block

First, a molding step was carried out. In the step, silicon carbide coarse powder (54.6% by weight) having an average particle size of 22 μm was mixed with silicon carbide fine powder (23.4% by weight) having an average particle size of 0.5 μm. The resulting mixture was blended with an organic binder (methyl cellulose) (4.3% by weight), a lubricant (NOF CORPORATION, UNILUB) (2.6% by weight), glycerin (1.2% by weight), and water (13.9% by weight) and kneaded to give a wet mixture. The wet mixture was extrusion molded.

In the present step, raw honeycomb molded bodies were manufactured which had the same shape as the honeycomb fired body 110 illustrated in FIG. 4A and had cells not sealed.

Next, the raw honeycomb molded bodies were dried by a microwave dryer to manufacture dried honeycomb molded bodies. Then, predetermined cells of the dried honeycomb molded bodies were filled with a plug material paste to be sealed. Here, the wet mixture was used as a plug material paste. After plugging of the cells, the dried honeycomb molded bodies with the plug material paste filled therein were again dried by a dryer.

Subsequently, the dried honeycomb molded bodies with sealed cells were degreased at 400° C. and further fired at 2200° C. at normal pressure under argon atmosphere for three hours.

In this manner, rectangular pillar-shaped honeycomb fired bodies were manufactured.

An adhesive paste was applied between the resulting honeycomb fired bodies to form an adhesive paste layer. The adhesive paste layer was heated to be solidified, thereby forming an adhesive layer. In this manner, a substantially rectangular pillar-shaped honeycomb aggregated body was manufactured in which 16 pieces of the honeycomb fired bodies were bonded by the adhesive layer.

The adhesive paste used contained alumina fibers (30% by weight) having an average fiber length of 20 μm, silicon carbide particles (21% by weight) having an average particle size of 0.6 μm, silica sol (15% by weight), carboxy methyl cellulose (5.6% by weight), and water (28.4% by weight).

Then, the periphery of the rectangular pillar-shaped honeycomb aggregated body was cut into a round pillar shape with a diamond cutter, thereby manufacturing a round pillar-shaped ceramic block having a diameter of 142.7 mm.

(Preparation of Application Jig)

A polyacetal application jig was prepared which had a shape as illustrated in FIGS. 1 and 2.

The application jig was manufactured by injection molding.

The application jig had the diameter $R_1$ of the first opening section of 150.5 mm, the diameter $R_2$ of the second opening section of 143.8 mm, the thickness T of the application jig of 14.5 mm, the thickness $T_2$ of the second opening section of 2 mm (length of the straight portion: 2 mm), and the angle θ of 75° (inclination θ of the tapered portion: 75°).

(Formation of Peripheral Sealing Material Layer)

The sealing material paste prepared was the same paste as the adhesive paste.

The sealing material paste was put on the peripheral surface of the ceramic block with a spatula.

As illustrated in FIGS. 6A, 6B, and 6C, the ceramic block was placed on the positioning lower jig and fixed between the positioning upper jig and the positioning lower jig.

Then, the scraping step in which the application jig was moved in an upward direction was carried out, so that the straight portion of the application jig spreads the entire peripheral surface of the ceramic block with the sealing material paste.

In the scraping step, the spacing between the peripheral surface of the ceramic block and the face forming the second opening section of the application jig was set to 0.55 mm.

Next, the sealing material paste was dried to be solidified in a drying furnace at 120° C. for 10 minutes.

The steps described above are the first sealing material paste putting step, the first scraping step, and the first drying step. The resulting peripheral sealing material layer is the first peripheral sealing material layer.

Subsequently, the sealing material paste was put on the first peripheral sealing material layer, and the second scraping step and the second drying step were carried out in the same manner as in the above first steps.

Thus, a honeycomb structured body having a peripheral sealing material layer was manufactured.

Examples 2 to 5

Honeycomb structured bodies were manufactured in the same manner as in Example 1, except that the inclination θ of the tapered portion of the application jig was set to 65° (Example 2), 70° (Example 3), 80° (Example 4), and 85°

(Example 5). The diameter $R_1$ of the first opening section was changed in accordance with the change of the inclination θ of the tapered portion.

Examples 6, 7

Honeycomb structured bodies were manufactured in the same manner as in Example 1, except that the inclination θ of the application jig was set to 45° (Example 6) and 60° (Example 7). The diameter $R_1$ of the first opening section was changed in accordance with the change of the inclination θ of the tapered portion.

Example 8, 9

Honeycomb structured bodies were manufactured in the same manner as in Example 1, except that the length of the straight portion of the application jig was set to 5 mm (Example 8) and 8 mm (Example 9). The diameter $R_1$ of the first opening section was smaller than that in Example 1 in accordance with the change of the length of the straight portion.

Example 10

A honeycomb structured body was manufactured in the same manner as in Example 1, except that the second sealing material paste putting step, the second scraping step, and the second drying step were not carried out after formation of the first peripheral sealing material layer.

Comparative Example 1

A honeycomb structured body was manufactured in the same manner as in Example 1, except that the scraper used was formed of urethane rubber and had a shape without a tapered portion as disclosed in WO 2005/045210.
(Thickness Measurement and Appearance Inspection)

The honeycomb structured body manufactured in Example 1 had a diameter of 143.8 mm. Since the ceramic block had a diameter of 142.7 mm, the thickness of the peripheral sealing material layer was 0.55 mm.

Visual inspection of the appearance of the peripheral sealing material layer clarified that cells were not exposed and the peripheral sealing material layer was formed over the entire peripheral surface of the ceramic block.

Figure 8:
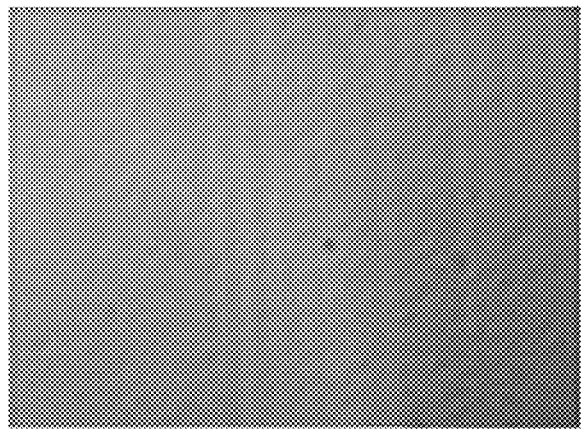
FIG. 8 is a photograph of a peripheral sealing material layer of a honeycomb structured body manufactured in Example 1.

FIG. 8 shows a photograph of the peripheral sealing material layer of the honeycomb structured body manufactured in Example 1.

As shown in the photograph of FIG. 8, "shrinkage", "streaks", and "cracks" were not found on the surface of the peripheral sealing material layer and the surface condition thereof was excellent.

The number of holes having a diameter of not less than 2 mm was 13.

The peripheral sealing material layers manufactured in Examples 2 to 5 each had a thickness of 0.55 mm. Cells were not exposed and the peripheral sealing material layer was formed over the entire peripheral surface of the ceramic block.

No "shrinkage", "streaks", or "cracks" was found on the surface of the peripheral sealing material layer and the surface condition thereof was excellent.

The peripheral sealing material layers manufactured in Examples 6 and 7 each had a thickness of 0.55 mm. Cells were not exposed and the peripheral sealing material layer was formed over the entire peripheral surface of the ceramic block.

The peripheral sealing material layer had streaks on the surface along the moving direction of the application jig.

The peripheral sealing material layers manufactured in Examples 8 and 9 had a thickness of 0.55 mm. Cells were not exposed and the peripheral sealing material layer was formed on the entire peripheral surface of the ceramic block.

The number of holes having a diameter of not less than 2 mm found on the surface of the peripheral sealing material layer was 20 in Example 8 and 36 in Example 9.

The peripheral sealing material layer manufactured in Example 10 had a thickness of 0.55 mm. Cells were not exposed and the peripheral sealing material layer was formed on the entire peripheral surface of the ceramic block.

On the surface of the peripheral sealing material layer, cracks due to the first drying step were observed.

The peripheral sealing material layer manufactured in Comparative Example 1 had a variation in thickness. A thick part of the sealing material layer had a thickness of 0.70 mm and a thin part of the sealing material layer had a thickness of 0.40 mm, and cells were partly exposed.

Second Embodiment

The following will describe a second embodiment that is one embodiment of the present invention.

An application jig according to the second embodiment of the present invention is an application jig used for forming a peripheral sealing material layer on the peripheral surface of a cylindroid ceramic block.

Figure 9:
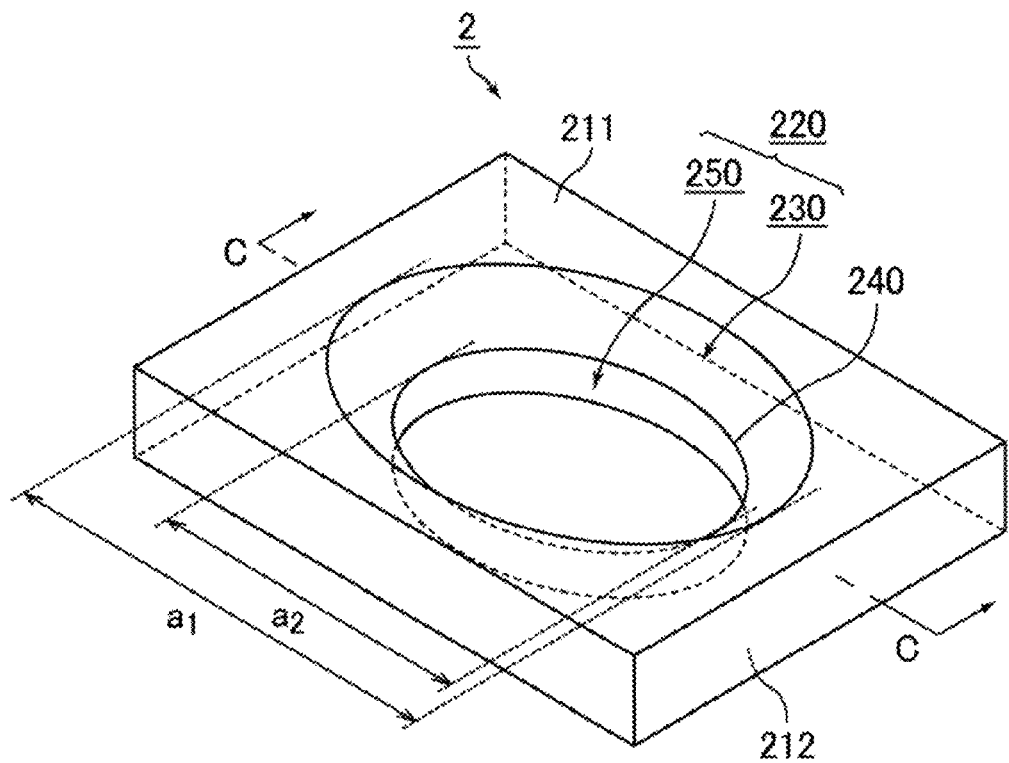
FIG. 9 is a perspective view schematically illustrating one example of an application jig according to a second embodiment of the present invention.

FIG. 9 is a perspective view schematically illustrating one example of the application jig according to the second embodiment of the present invention.

An application jig 2 illustrated in FIG. 9 is a plate-like jig having a first principal surface 211 and a second principal surface 212, as with the application jig 1 illustrated in FIG. 1.

The central portion of the application jig 2 has an opening section 220. A first opening section 230 and a second opening section 250 each have an elliptical cross-sectional shape when cut in a plane parallel with the second principal surface 212.

The boundary between the first opening section 230 and the second opening section 250 is indicated by a boundary line 240.

The diameter of the first opening section 230 is represented by a major axis a1.

The length of the major axis a1 gradually decreases from the first principal surface 211 toward the boundary line 240. Thus, the requirement "the first opening section has a diameter gradually decreasing from the first principal surface toward a boundary line between the first opening section and the second opening section" is satisfied.

The diameter of the second opening section 250 is represented by the major axis a2.

The length of the major axis a2 is constant from the boundary line 240 toward the second principal surface 212. Thus, the requirement "the second opening section has a diameter constant from the boundary line toward the second principal surface" is satisfied.

Figure 10:
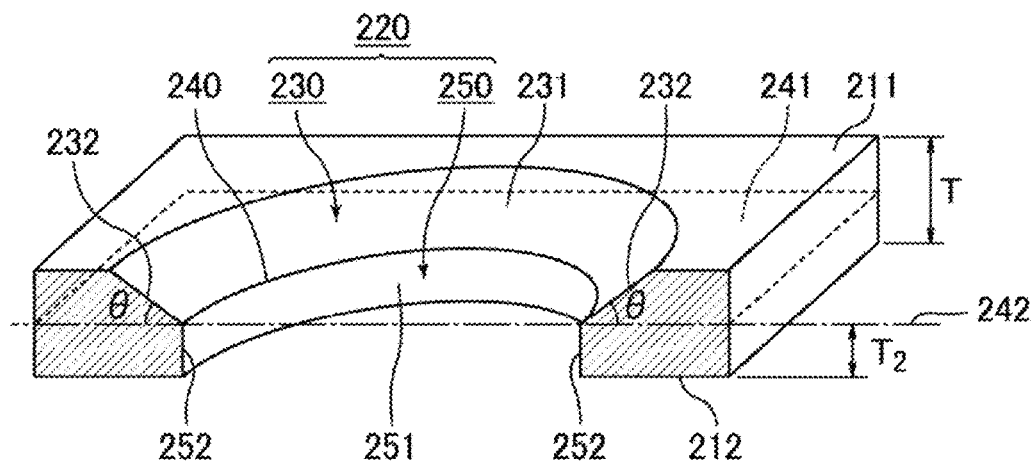
FIG. 10 is a C-C line cross-sectional view of the application jig illustrated in FIG. 9.

FIG. 10 is a C-C line cross-sectional view of the application jig illustrated in FIG. 9.

FIG. 10 shows a cross section cut at a major axis of the ellipse that is a cross section of the first opening section 230.

In the application jig 2, similar to the application jig 1 illustrated in FIG. 2, a face 231 forming the first opening section 230, a tapered portion 232, a face 251 forming the second opening section 250, and a straight portion 252 are defined.

An inclination θ of the tapered portion 232 is an angle formed inside the application jig 2 among the angles between a line 242 in a cross-sectional view illustrated in FIG. 10 and the tapered portion 232, the line 242 corresponding to a hypothetical plane spreading along the boundary line 240 in a direction in parallel with the second principal surface 212 in the cross-sectional view along the major axes a1 and a2 illustrated in FIG. 10.

Other configurations of the application jig 2 may be similar to those of the application jig 1 according to the first embodiment of the present invention.

Figure 11:
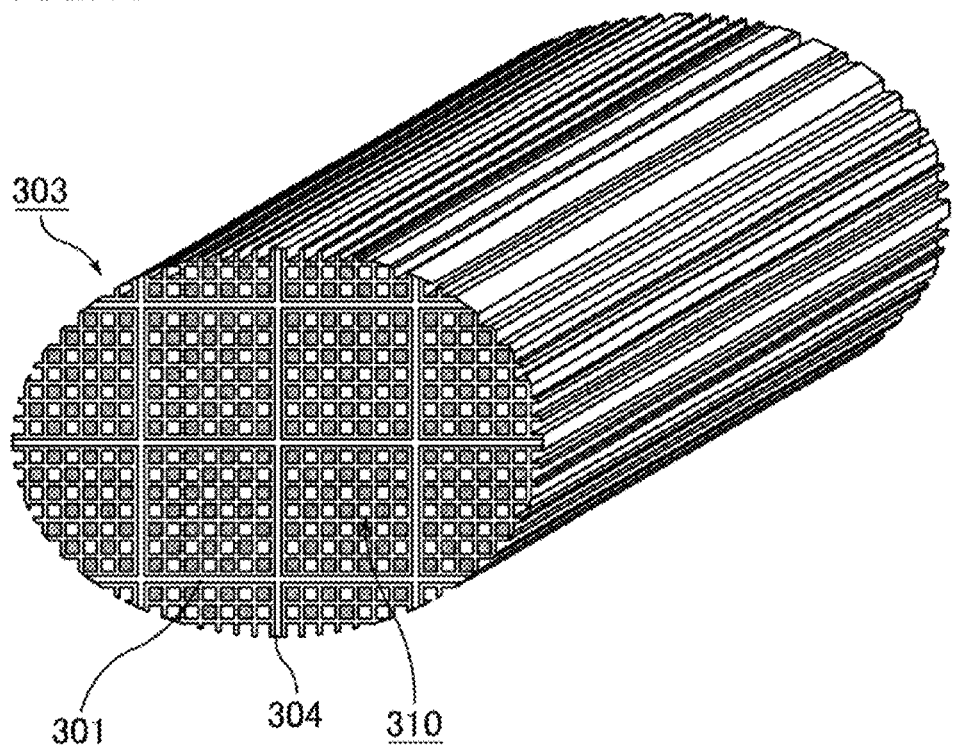
FIG. 11 is a perspective view schematically illustrating another example of the ceramic block.

FIG. 11 is a perspective view schematically illustrating another example of the ceramic block.

The application jig 2 of the present embodiment is suitably used in formation of a peripheral sealing material paste layer on the peripheral surface of the cylindroid ceramic block as illustrated in FIG. 11.

The ceramic block 303 illustrated in FIG. 11 has a similar configuration as the round pillar-shaped ceramic block 103 described in the first embodiment, except that a honeycomb aggregated body including a plurality of honeycomb fired bodies 310 bonded by an adhesive layer 301 has a cylindroid shape after grinding. Accordingly, a detailed description thereof is omitted.

The honeycomb fired body 310 and the adhesive layer 301 are respectively similar to the honeycomb fired body 110 and the adhesive layer 101 described in the first embodiment.

The use of the application jig 2 of the present embodiment enables manufacturing of a honeycomb structured body in which a peripheral sealing material layer is formed over the entire peripheral surface 304 of the ceramic block 303 by the procedure mentioned in the description on the method for manufacturing a honeycomb structured body of the first embodiment.

The application jig and the method for manufacturing a honeycomb structured body according to the second embodiment of the present invention can also exert the effects (1) to (13) described in the first embodiment of the present invention.

In the following, a description is given on a third embodiment that is one embodiment of the present invention.

In the application jig according to the third embodiment of the present invention, grooves are provided on a face forming the second opening section in a direction from the boundary line toward the second principal surface.

Figure 12:
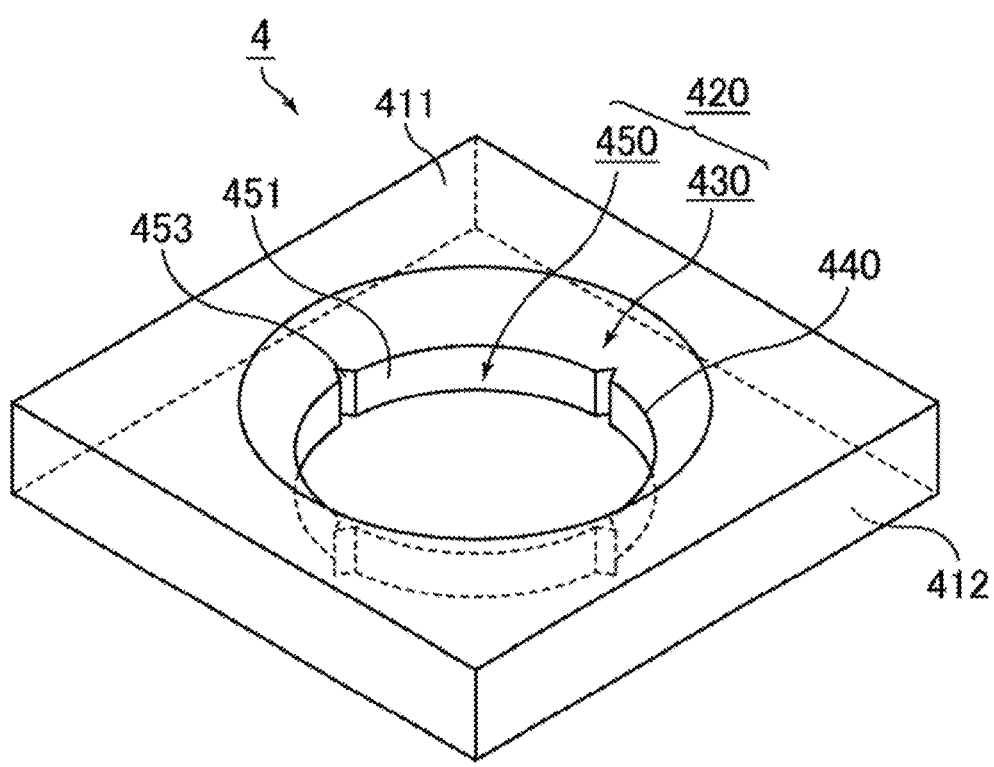
FIG. 12 is a perspective view schematically illustrating one example of an application jig according to a third embodiment of the present invention.

FIG. 12 is a perspective view schematically illustrating one example of the application jig according to the third embodiment of the present invention.

An application jig 4 illustrated in FIG. 12 is a plate-like jig having a first principal surface 411 and a second principal surface 412, as with the application jig 1 illustrated in FIG. 1.

The central portion of the application jig 4 has an opening section 420 and the shape of the first opening section 430 is the same as the shape of the first opening section 30 of the application jig 1.

The second opening section 450 has a shape substantially similar to the shape of the second opening section 50 of the application jig 1. A face 451 forming the second opening section 450 has grooves 453 provided thereon.

The grooves 453 are provided in a direction from a boundary line 440 toward a second principal surface 412.

Figure 13:
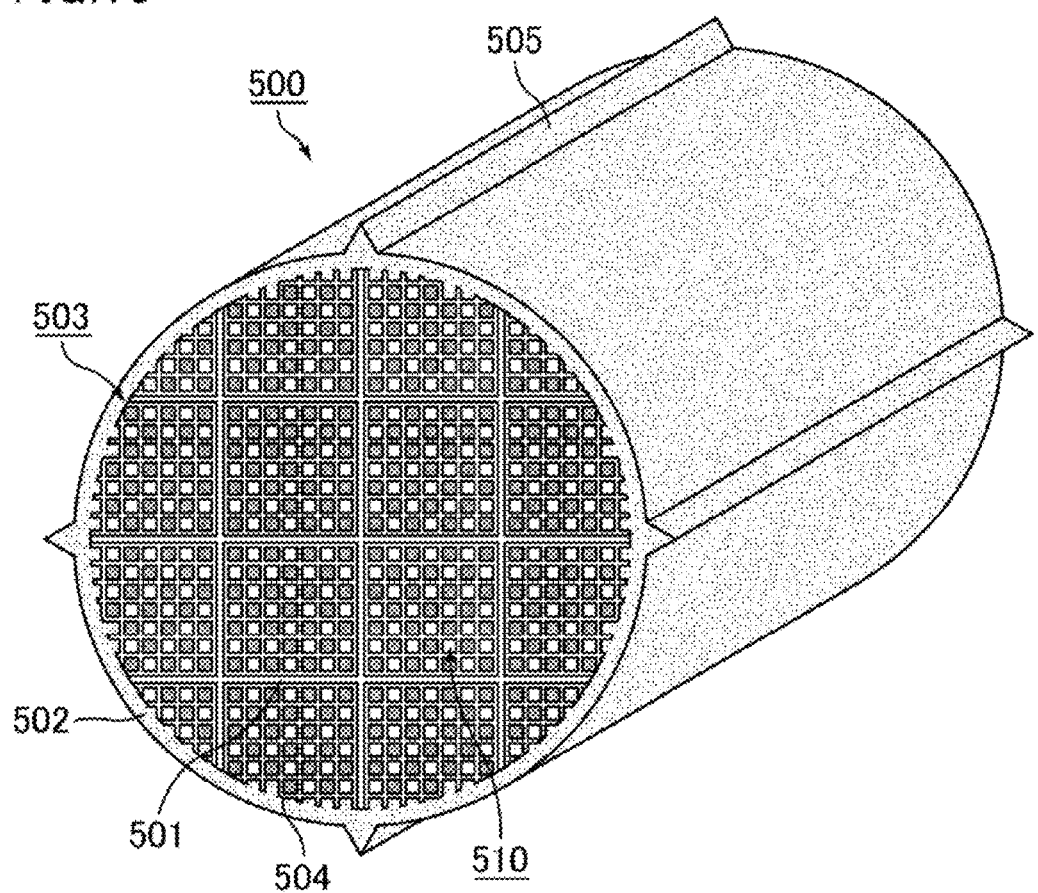
FIG. 13 is a perspective view illustrating one example of a honeycomb structured body manufacturable with use of the application jig illustrated in FIG. 12.

FIG. 13 is a perspective view illustrating one example of a honeycomb structured body manufacturable with use of the application jig illustrated in FIG. 12.

A honeycomb structured body 500 illustrated in FIG. 13 includes a round pillar-shaped ceramic block 503 with a peripheral sealing material layer 502 formed on a peripheral surface 504, the ceramic block 503 being manufactured by grinding the periphery of a honeycomb aggregated body into a round pillar shape, the honeycomb aggregated body including a plurality of honeycomb fired bodies 510 bonded to one another by an adhesive layer 501.

Protrusions 505 are provided at four positions in the peripheral sealing material layer 502. The protrusions are portions where the peripheral sealing material layer is thicker than the other portions.

The positions, number, and shape of the protrusions 505 correspond to the positions, number, and shape of the grooves 453 provided in the application jig 4 illustrated in FIG. 12, respectively.

The use of the application jig 4 having the grooves 453 in the scraping step enables formation of a peripheral sealing material layer having the protrusions 505.

The use of the application jig 4 of the present embodiment enables manufacturing of a honeycomb structured body having a peripheral sealing material layer with the protrusions 505 formed on the peripheral surface 504 of the ceramic block 503 by the procedure mentioned in the description on the method for manufacturing a honeycomb structured body of the first embodiment.

Figure 14:
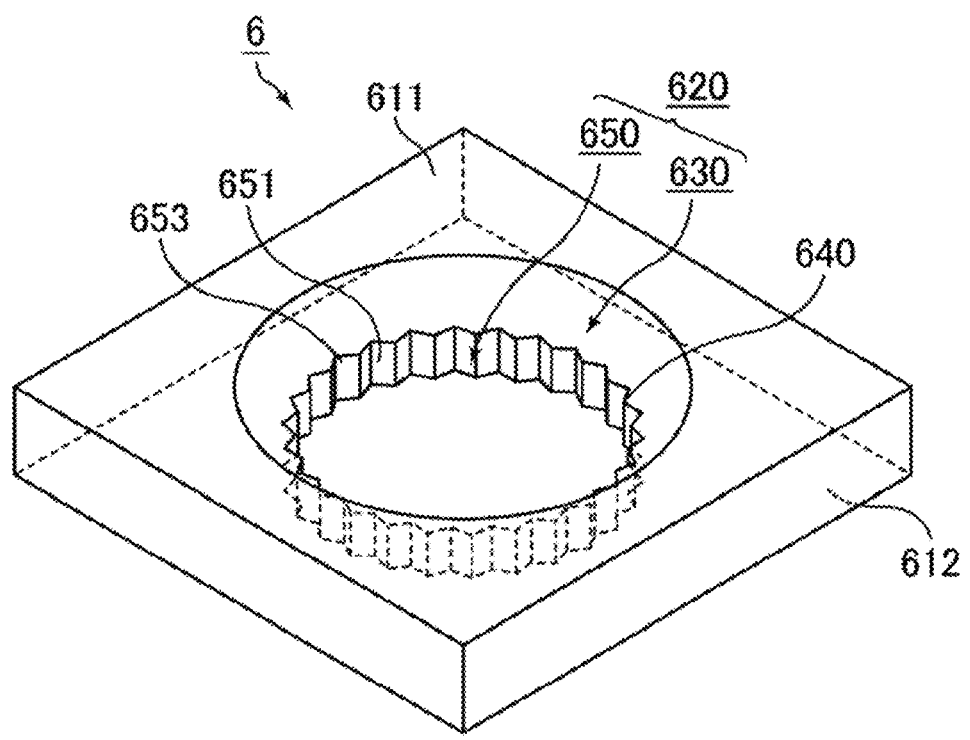
FIG. 14 is a perspective view schematically illustrating another example of the application jig according to the third embodiment of the present invention.

FIG. 14 is a perspective view schematically illustrating another example of the application jig according to the third embodiment of the present invention.

The application jig 6 illustrated in FIG. 14 has a similar configuration as the application jig 4 illustrated in FIG. 12 and is a plate-like jig having a first principal surface 611 and a second principal surface 612.

The central portion of the application jig 6 has an opening section 620. The first opening section 630 has a similar shape as the first opening section 430 of the application jig 4.

The second opening section 650 has a large number of grooves 653 formed in a direction from a boundary line 640 toward the second principal surface 612.

Figure 15:
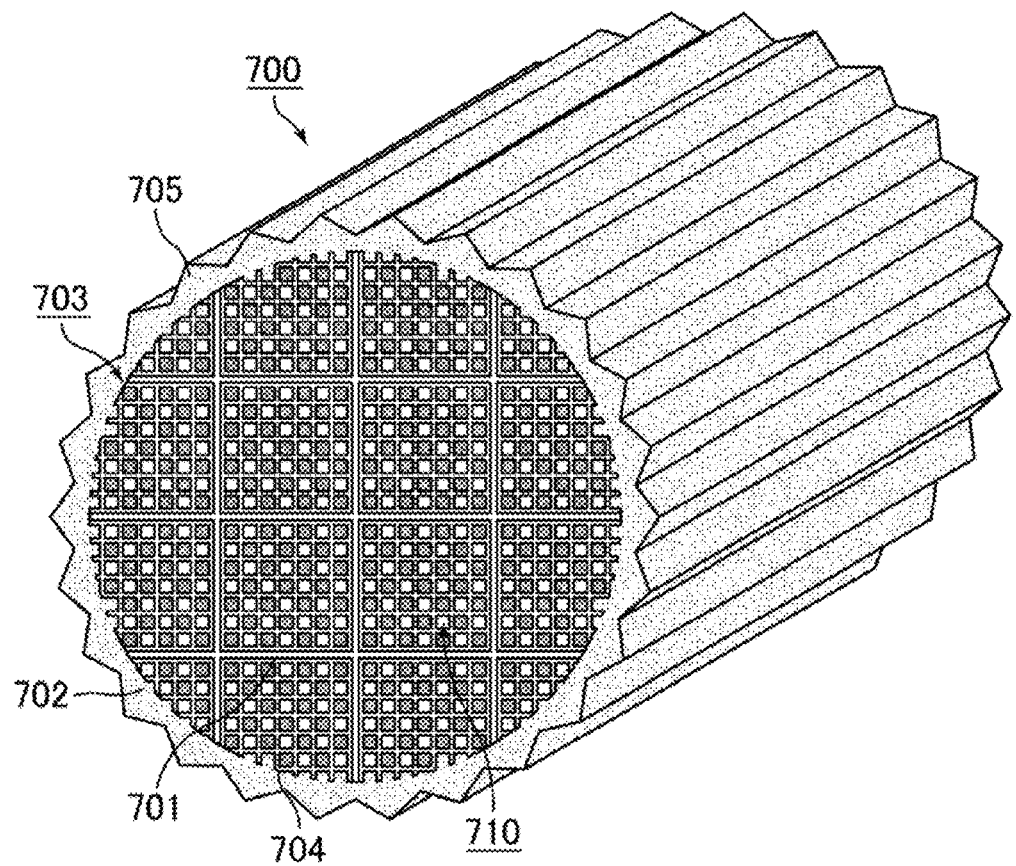
FIG. 15 is a perspective view illustrating one example of a honeycomb structured body manufacturable with use of the application jig illustrated in FIG. 14.

FIG. 15 is a perspective view illustrating one example of a honeycomb structured body manufacturable with use of the application jig illustrated in FIG. 14.

A honeycomb structured body 700 illustrated in FIG. 15 includes a round pillar-shaped ceramic block 703 with a peripheral sealing material layer 702 formed on a peripheral surface 704, the ceramic block 703 being formed by grinding a honeycomb aggregated body into a round pillar shape, the honeycomb aggregated body including a plurality of honeycomb fired bodies 710 bound to one another by an adhesive layer 701.

The peripheral sealing material layer 702 is provided with a large number of protrusions 705.

The position, number, and shape of the protrusions 705 correspond to the position, number, and shape of the grooves 653 provided in the application jig 6 illustrated in FIG. 14.

The scraping step with use of the application jig 6 having the grooves 653 enables formation of a peripheral sealing material layer having the protrusions 705.

The use of the application jig 6 of the present embodiment enables manufacturing of a honeycomb structured body including the ceramic block 703 with a peripheral sealing material layer having the protrusions 705 formed on the peripheral surface 704, by the procedure mentioned in the description on the method for manufacturing a honeycomb structured body of the first embodiment.

The application jig and the method for manufacturing a honeycomb structured body according to the third embodiment of the present invention can exert the effects (1) to (13) described in the first embodiment of the present invention, and further exerts the following effect.

(14) In the application jig of the present embodiment, the face forming the second opening section is provided with grooves in a direction from the boundary line to the second principal surface.

The grooves provided in the application jig enables to provide protrusions on a peripheral sealing material layer formed with use of the application jig. With the protrusions, the friction force is generated between the protrusions and a holding sealing material wound around the honeycomb structured body, enhancing the tight contact between the peripheral sealing material layer and the holding sealing material.

Though the shape of the grooves illustrated in FIGS. 12 and 14 have a triangular shape in a top view, the shape of the grooves in the present embodiment is not limited to the triangular shape. Protrusions in a shape corresponding to the shape of the grooves are provided, and the friction force in accordance with the shape of the protrusions is provided.

Other Embodiments

The thickness of the peripheral sealing material layer formed with use of the application jig of the embodiment of the present invention may or may not be constant over the periphery of the honeycomb structured body.

In a case where the shape of the peripheral surface of the ceramic block and the shape of the face forming the second opening section of the application jig are different from each other, the thickness of the peripheral sealing material layer can be determined in accordance with the spacing between the two faces.

Figure 16A:
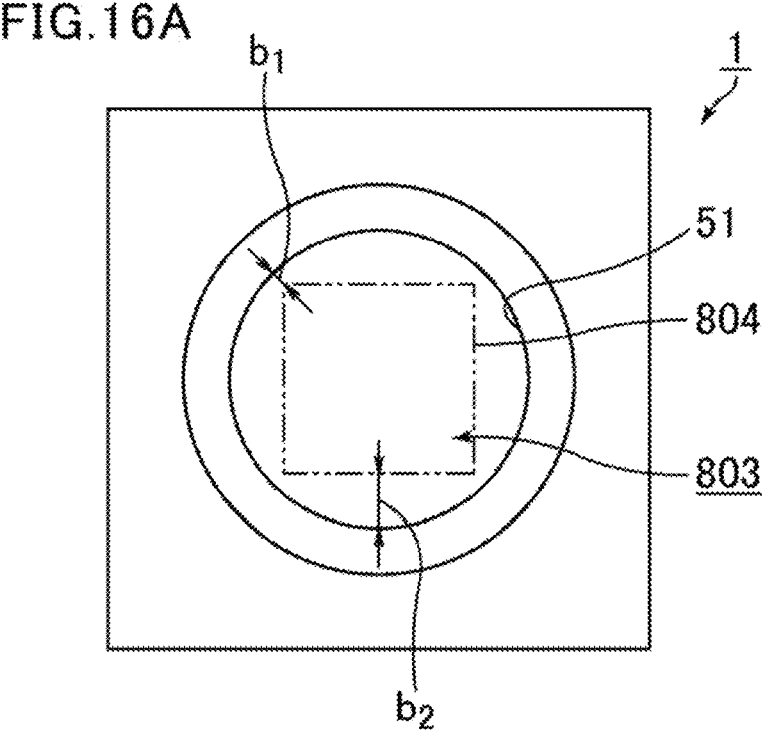
FIGS. 16A and 16B each are a top view illustrating one example of a positional relationship between the application jig and the ceramic block.
Figure 16B:
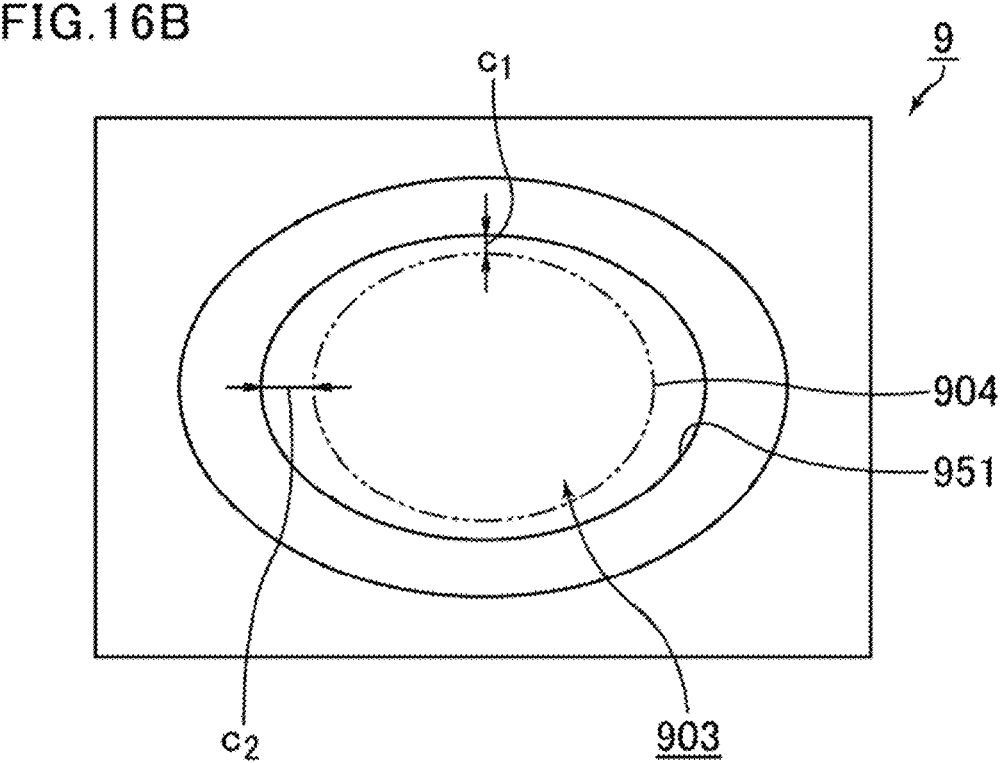

FIGS. 16A and 16B each are a top view illustrating one example of a positional relationship between the application jig and the ceramic block.

FIG. 16A schematically illustrates a positional relationship in a case where the application jig 1 illustrated in FIG. 1 is used for applying a sealing material paste to a peripheral surface 804 of a rectangular pillar-shaped ceramic block 803.

In FIG. 16A, the ceramic block 803 is indicated by a dotted line.

In the top view illustrated in FIG. 16A, the shape of the peripheral surface 804 of the ceramic block 803 is a rectangle and the shape of the face 51 forming the second opening section of the application jig 1 is a circle. In other words, the shapes are different from each other.

In such a case, the thickness of the sealing material paste applied with the use of the application jig is not constant. The thickness $b_1$ of the sealing material paste at vertices of the rectangle forming the peripheral surface 804 is small, and the thickness $b_2$ of the sealing material paste at the center portions of the sides of the rectangle is large.

The use of such an application jig enables to manufacture a round pillar-shaped honeycomb structured body from a rectangular pillar-shaped ceramic block.

In an application jig 9 in the top view illustrated in FIG. 16B, the shape of a face 951 forming a second opening section is an ellipse.

In FIG. 16B, a ceramic block 903 is indicated by a dotted line.

The shape of the peripheral surface 904 of the ceramic block 903 is an ellipse.

The flattening is different between the ellipse indicating the face 951 forming the second opening section and the ellipse indicating the peripheral surface 904 of the ceramic block 903. Accordingly, the spacing between the peripheral surface 904 of the ceramic block 903 and the face 951 forming the second opening section of the application jig 9 is not constant.

In this case, the thickness of the sealing material paste applied with use of the application jig is not constant. The thickness $c_1$ of the sealing material paste at a position corresponding to the minor axis of the ellipse is small and the thickness $c_2$ of the sealing material paste at a position corresponding to the major axis of the ellipse is large.

The use of the application jig and the ceramic block enables to form a peripheral sealing material layer having a predetermined thickness, though the thickness is not constant.

In the method for manufacturing a honeycomb structured body of the embodiment of the present invention, the ceramic block may be a single pillar-shaped honeycomb fired body in which a large number of cells for passing gases therethrough are disposed in parallel in a longitudinal direction and a cell wall is provided to separate the cells.

Figure 17:
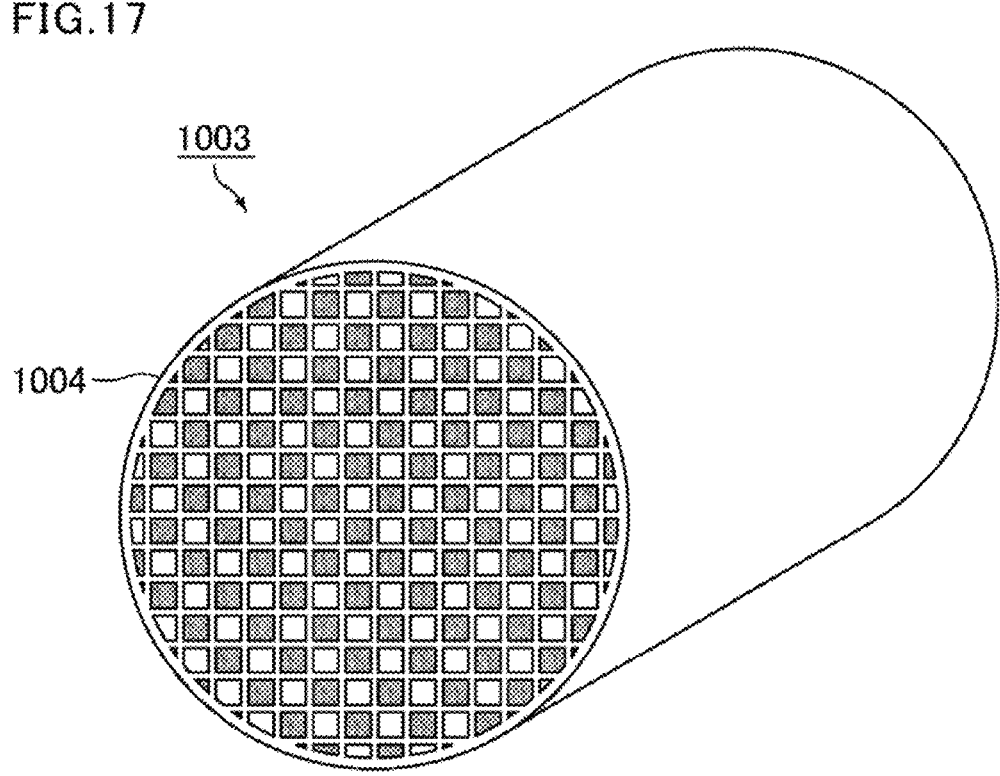
FIG. 17 is a perspective view schematically illustrating another example of the ceramic block.

FIG. 17 is a perspective view schematically illustrating another example of the ceramic block.

A ceramic block 1003 illustrated in FIG. 17 is a single round pillar-shaped honeycomb fired body. The ceramic block 1003 is manufactured by firing an extrusion-molded honeycomb molded body, and is not subjected to a bonding step and a grinding step.

Cells are therefore not exposed on a peripheral surface 1004 of the ceramic block 1003.

The use of the application jig of the embodiment of the present invention enables to favorably apply a sealing material paste to a peripheral surface of such a ceramic block.

The application jig of the embodiment of the present invention is not limited to a plate-like jig described in the above embodiments, and may be, for example, a jig in which a first principal surface and a second principal surface each have a ring shape.

Specifically, the peripheral shape of the application jig may be a circular or elliptic shape that is similar to the cross-sectional shape of the first opening section, not a square or rectangular shape illustrated in FIGS. 1 and 9.

The application jig of the embodiment of the present invention is not limited to an integral plate-like jig described in the above embodiments, and may be broken down into plural components. For example, the jig may have a cross sectional shape as illustrated in FIG. 2 and may be divided in two. The use of the application jig enables to perform the scraping step starting from the center portion of a ceramic block in a longitudinal direction. In such a case, the application jig components are assembled and set at the center portion of the ceramic block in the longitudinal direction.

The application jig of the embodiment of the present invention may have a guide hole or guide pin for adjusting a positional relationship with a positioning jig. In an exemplary case, guide holes are provided at four corners of the application jig illustrated in FIG. 1. Axes provided between a positioning upper jig and a positioning lower jig are passed through the guide holes of the application jig, so that the positional relationship between the application jig and the positioning jig is easily determined.

In this manner, the positioning of the center of the opening section of the application jig and the center of the ceramic block is easily matched, so that the thickness of the peripheral sealing material layer may be constant.

In the method for manufacturing a honeycomb structured body of the embodiment of the present invention, the number of repetition times of the sealing material paste putting step, the scraping step, and the drying step is not limited to 2 and may be 3 or more.

In the case of repeating the steps, the direction of the scraping in the first performance may be turned in the opposite direction in the second performance. In an exemplary case, the ceramic block is removed from the positioning jig after the first scraping step and drying step and turned upside down. The ceramic block is again set on the positioning jig and is subjected to the second scraping step.

The cross section of each cell of the honeycomb fired body in a direction orthogonal to the longitudinal direction of the honeycomb fired body is not limited to have a substantially rectangular shape and may have any shape, for example, a substantially circular shape, a substantially elliptical shape, a substantially pentagonal shape, a substantially hexagonal shape, a substantially trapezoidal shape, or a substantially octagonal shape. Alternatively, various shapes of cells may be present.

For example, cells may include large-volume cells having a substantially octagonal cross-sectional shape in a direction orthogonal to the longitudinal direction of the honeycomb fired body and small-volume cells having a substantially rectangular cross-sectional shape in a direction orthogonal to the longitudinal direction of the honeycomb fired body.

The cell density in the cross section in a direction orthogonal to the longitudinal direction of the honeycomb fired body is not particularly limited. The lower limit is preferably 31.0 pcs/cm$^2$ (200 pcs/inch$^2$) and the upper limit is preferably 93.0 pcs/cm$^2$ (600 pcs/inch$^2$). The lower limit is more preferably 38.8 pcs/cm$^2$ (250 pcs/inch$^2$) and the upper limit is more preferably 77.5 pcs/cm$^2$ (500 pcs/inch$^2$).

The thickness of the cell wall in the honeycomb fired body is not particularly limited and is preferably in a range from 0.12 to 0.40 mm.

If the thickness of the cell wall of the honeycomb fired body is less than 0.12 mm, the cell wall is too thin, failing to maintain the strength of the honeycomb fired body. If the thickness of the cell wall of the honeycomb fired body is more than 0.40 mm, the pressure loss of the honeycomb structured body tends to increase.

Examples of the inorganic binder contained in the sealing material paste include silica sol and alumina sol. Each of these may be used alone, or two or more of these may be used in combination. Among the inorganic binders, preferred is silica sol.

Examples of the organic binder contained in the sealing material paste include polyvinyl alcohol, methyl cellulose, ethyl cellulose, and carboxy methyl cellulose. Each of these may be used alone, or two or more of these may be used in combination. Among the organic binders, preferred is carboxy methyl cellulose.

Examples of the inorganic particles contained in the sealing material paste include carbide particles and nitride particles. Specific examples thereof include silicon carbide particles, silicon nitride particles, and boron nitride particles. Each of these may be used alone, or two or more of these may be used in combination. Among the inorganic particles, preferred are silicon carbide particles due to excellent thermal conductivity.

The inorganic fibers contained in the sealing material paste may be composed of silica-alumina, mullite, alumina, silica or the like. Each of these may be used alone or two or more of these may be used in combination. Among the inorganic fibers, preferred are alumina fibers. The inorganic fibers may be biosoluble fibers. Instead of the inorganic fibers or together with the inorganic fibers, a whisker composed of the similar material as the inorganic fibers may be used.

Examples of the biosoluble fibers include inorganic fibers containing at least one material selected from the group consisting of alkali metal compounds, alkaline earth metal compounds, and boron compounds.

Examples of the alkali metal compounds include oxides of Na and K, and examples of the alkaline earth metal compound include oxides of Mg, Ca, and Ba. Examples of the boron compound include oxides of B.

The biosoluble fibers preferably have solubility in saline at 37° C. of 300 ppm (0.03% by weight) or more. Since the inorganic fibers having a solubility of 300 ppm (0.03% by weight) or more are rapidly dissolved under physiological conditions, hazards when the inorganic fibers are taken in the living body can be reduced.

Moreover, the sealing material paste may optionally contain a pore-forming agent such as balloons that are fine hollow spheres containing oxide ceramic, spherical acrylic particles, and graphite. The balloons are not particularly limited, and examples thereof include alumina balloons, glass microballoons, sirasu balloons, fly ash balloons (FA balloons), and mullite balloons. Among these, preferred are alumina balloons.

Essentially, the application jig of the embodiment of the present invention has an opening section penetrating from the first principal surface to the second principal surface, wherein the includes a first opening section on the first principal surface side and a second opening section on the second principal surface side, the first opening section has a diameter gradually decreasing from the first principal surface toward a boundary line between the first opening section and the second opening section, and the second opening section has a constant diameter from the boundary line toward the second principal surface.

According to the method for manufacturing a honeycomb structured body of the embodiment of the present invention, essentially, a ceramic block is placed inside the second opening section of the embodiment of the present invention in such a manner that the spacing between the peripheral surface of the ceramic block and the face forming the second opening section is constant, and the ceramic block is passed through the opening section of the application jig in the scraping step so that the face forming the second opening section of the application jig spreads the entire peripheral surface of the ceramic block with the sealing material paste.

Desired effects can be achieved by appropriately combining the above essential features with various configurations described in the first to third embodiments and other embodiments (e.g., angle of the tapered portion, length of the straight portion, material of the application jig, cross-sectional shapes of the first opening section and the second opening section, shape of the ceramic block, spacing between the peripheral surface of the ceramic block and the face forming the second opening section of the application jig).

Obviously, numerous modifications and variations of the present invention are possible in light of the above teachings. It is therefore to be understood that within the scope of the appended claims, the invention may be practiced otherwise than as specifically described herein.

The invention claimed is:

1. A method of manufacturing a honeycomb structured body, comprising:
providing an application jig comprising:
a first principal surface;
a second principal surface provided on an opposite side of the first principal surface; and
an opening section penetrating from the first principal surface to the second principal surface and comprising:
a first opening section provided on the first principal surface side; and
a second opening section provided on the second principal surface side and having a substantially constant diameter from the second principal surface toward a boundary line between the first opening section and the second opening section, the first opening section having a diameter gradually decreasing from the first principal surface toward the boundary line;
putting a sealing material paste on a peripheral surface of a pillar-shaped ceramic block;
setting the application jig in such a manner that the first principal surface faces upward and the second principal surface faces downward;
placing the ceramic block inside the second opening section of the application jig; and
passing the ceramic block through the opening section of the application jig so that a face defining the second opening section spreads an entire peripheral surface of the ceramic block with the sealing material paste to manufacture a honeycomb structured body with a peripheral sealing material layer formed on the peripheral surface of the ceramic block.

2. The method according to claim 1,
wherein, in the passing the ceramic block, the application jig with the first principal surface facing upward and the second principal surface facing downward is moved in an upward direction.

3. The method according to claim 1,
wherein the ceramic block is placed in a manner as to set a spacing between the peripheral surface of the ceramic block and the face defining the second opening section constant.

4. The method according to claim 3,
wherein the spacing between the peripheral surface of the ceramic block and the face defining the second opening section of the application jig is about 0.40 to about 0.70 mm.

5. The method according to claim 1,
wherein the ceramic block is placed in a manner as to set a spacing between the peripheral surface of the ceramic block and the face defining the second opening section not constant.

6. The method according to claim 1,
wherein the ceramic block is placed in a manner such that a center of the ceramic block and a center of the opening section of the application jig are matched to one another.

7. The method according to claim 6,
wherein a positioning jig is used to place the ceramic block, the positioning jig being capable of determining positions of the ceramic block and the application jig by matching the center of the ceramic block to the center of the opening section of the application jig.

8. The method according to claim 1,
wherein the ceramic block is manufactured through manufacturing a rectangular pillar-shaped honeycomb fired body having cells for passing gas therethrough disposed in parallel in a longitudinal direction and a cell wall provided to separate the cells, binding a plurality of the honeycomb fired bodies to manufacture a rectangular pillar-shaped honeycomb aggregated body, and grinding a peripheral surface of the honeycomb aggregated body; and
cells cut in the grinding are exposed on the peripheral surface of the ceramic block.

9. The method according to claim 1,
wherein the ceramic block comprises a single pillar-shaped honeycomb fired body including cells for passing gas therethrough disposed in parallel in a longitudinal direction and a cell wall provided to separate the cells.

* * * * *